(12) United States Patent
Atarashi et al.

(10) Patent No.: US 7,545,724 B2
(45) Date of Patent: Jun. 9, 2009

(54) OPTICAL PICKUP APPARATUS, OPTICAL ELEMENT FOR OPTICAL PICKUP APPARATUS AND PRODUCING METHOD OF OPTICAL ELEMENT

(75) Inventors: Yuichi Atarashi, Hachioji (JP); Kiyoshi Yamashita, Hachioji (JP); Yasuo Taima, Chofu (JP)

(73) Assignee: Konica Minolta Opto, Inc., Tokyo (JP)

( * ) Notice: Subject to any disclaimer, the term of this patent is extended or adjusted under 35 U.S.C. 154(b) by 934 days.

(21) Appl. No.: 10/884,916

(22) Filed: Jul. 7, 2004

(65) Prior Publication Data
US 2005/0063281 A1 Mar. 24, 2005

(30) Foreign Application Priority Data
Jul. 11, 2003 (JP) .............................. 2003-195956
Jul. 25, 2003 (JP) .............................. 2003-201779

(51) Int. Cl.
G11B 7/00 (2006.01)
(52) U.S. Cl. .............................. 369/112.01; 369/44.14; 369/44.37
(58) Field of Classification Search ........................ None
See application file for complete search history.

(56) References Cited

U.S. PATENT DOCUMENTS 5,059,003 A * 10/1991 Haus et al. ................... 359/243
7,091,271 B2 * 8/2006 James et al. ................. 524/430
7,099,261 B2 * 8/2006 Yoshida et al. ......... 369/124.03
2002/0185610 A1 * 12/2002 Stern ....................... 250/458.1

FOREIGN PATENT DOCUMENTS

| JP | 11-337818 | 12/1999 |
|---|---|---|
| JP | 2001-201601 | 7/2001 |
| JP | 2001-235677 | 8/2001 |
| JP | 2001-260139 | 9/2001 |
| JP | 2002-047425 | 2/2002 |
| JP | 2002-303701 | 10/2002 |
| JP | 2003-073563 | 3/2003 |
| JP | 2003-073564 | 3/2003 |

OTHER PUBLICATIONS

International Search Report for PCT/JP2004/009881.
English language Abstract of JP-11-337818.
English language Abstract of JP-2001-201601.
English language Abstract of JP-2001-235677.
English language Abstract of JP-2001-260139.
English language Abstract of JP-2002-047425.
English language Abstract of JP-2002-303701.
English language Abstract of JP-2003-073563.
English language Abstract of JP-2003-073564.

* cited by examiner

Primary Examiner—Muhammad N. Edun
(74) Attorney, Agent, or Firm—Finnegan, Henderson, Farabow, Garrett & Dunner, L.L.P.

(57) ABSTRACT

The present invention relates to an optical element for an optical pickup device, wherein the optical element is produced by molding a resin material, in which inorganic particles having a diameter of not more than 30 nm are dispersed in a plastic resin, an optical pickup device using the optical element, and a producing method of the optical element.

36 Claims, 6 Drawing Sheets

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OPTICAL PICKUP APPARATUS, OPTICAL ELEMENT FOR OPTICAL PICKUP APPARATUS AND PRODUCING METHOD OF OPTICAL ELEMENT

TECHNICAL FIELD

The present invention relates to an optical pickup device and to an optical element used in the optical pickup device, and in particular, to an optical pickup device wherein changes in optical functions including a light-converged spot forming function for changes in working temperature are extremely small, and precisions for reading and writing are very high, an optical element used in the optical pickup device and to a producing method.

TECHNICAL BACKGROUND

There have so far been developed and manufactured optical pickup devices (which are also called optical heads or optical head devices) for conducting reproducing/recording of information for optical information recording media (which are also called optical discs or media) such as CD (compact disc) and DVD (digital video disc, or digital versatile disc), and they have generally been popularized.

Further, standards for an optical information recording medium which allows higher density information recording have also been studied and developed.

In the optical pickup device of this kind, a light flux emitted from a light source (a laser diode is mainly used) is converged on an information recording surface of an optical disc through an optical system composed of a beam forming prism, a collimator, a beam splitter and an optical element such as an objective optical element, to form a spot, and a reflected light coming from an information recording pit (which is also called a pit) on the recording surface is converged on a sensor this time through the optical system again, so that information may be reproduced through conversion to electric signals. In this case, a light flux of the reflected light is changed depending on a shape of an information recording pit, which is used to distinguish information "0" from information "1". Incidentally, a protective substrate (a protective layer made of plastic which is also called a cover glass) is provided on the information recording surface of the optical disc.

When recording information on a recording type medium such as CD-R or CD-RW, a spot by a laser light flux is formed on a recording surface to generate thermo-chemical changes on a recording material on the recording surface. Due to this, irreversible changes take place on dyes, in the case of CD-R for example, and a form which is the same as an information recording pit is formed. In the case of CD-RW, a material of a phase-change type is used, and therefore, thermo-chemical changes cause reversible changes between the crystalline state and the amorphous state, which makes it possible to rewrite information.

In the optical pickup device for reproducing information from an optical disc that meets CD standards, NA of an objective lens is about 0.45 and a wavelength of a light source to be used is about 785 nm. For recording use, an objective lens whose NA is about 0.50 is commonly used. Incidentally, a thickness of a protective substrate of the optical disc meeting CD standards is 1.2 mm.

Though CD has been popularized widely as an optical information recording medium, DVD has been spreading during the past few years. The DVD is one wherein a storage capacity for information to be recorded has been increased by making a thickness of the protective substrate to be thinner than that of CD and by making an information recording pit to be smaller, and it has a huge storage capacity which is as high as about 4.7 GB (gigabyte) for about 600-700 MB (megabyte) of CD, to be frequently used as a distributed medium in which an animated image such as a movie is recorded.

Further, an optical pickup device for reproducing information from an optical disc meeting DVD standards is the same as that for CD in terms of principle. However, an optical pickup device wherein NA of an objective lens is about 0.60 and a wavelength of a light source to be used is about 655 nm is used as the optical pickup device for reproducing information from an optical disc meeting DVD standards, because information recording pits are made smaller as-stated above. For recording use, an objective lens whose NA is about 0.65 is commonly used. Incidentally, a thickness of a protective substrate of the optical disc meeting DVD standards is 0.6 mm.

With respect to an optical disc meeting DVD standards, those of a recording type are already put to practical use, and there are various standards including DVD-RAM, DVD-RW/R and DVD+RW/R. The technical principle for these is also the same as that of CD standards.

As stated above, further, the optical disc with higher density and higher capacity is now being proposed.

This optical disc is one that mainly employs a light source having a wavelength of about 405 nm which is one using the so-called blue-violet laser light source.

With regard to "the high density optical disc" of this kind, even when a wavelength to be used is determined, a protective substrate thickness, a storage capacity and NA are not determined equally.

Selection of the direction to improve recording density sharply makes a protective substrate thickness of an optical disc to be thin, and thereby, makes NA to be great. On the contrary, it is possible to make the protective substrate thickness and NA to be the same as standards of conventional discs such as DVD. In this case, the performance required as an optical system is relatively eased, although physical recording density is not raised sharply.

Specifically, there are proposed a thickness of a protective substrate that has been thinned further to 0.1 mm and a thickness of a protective substrate that has been made 0.6 mm to be the same as that of DVD.

Many of optical elements used in the optical pickup devices stated above are mostly those which are made of plastic resin through injection molding, or those which are made of glass through pressure molding.

Among them, the latter one representing an optical element made of glass has a refractive index which is varied less by temperature changes in general, and is used for a beam forming prism arranged near the light source representing a heat source. However, it has a problem that its manufacturing cost is relatively high. Therefore, its application to various optical elements such as a collimator, a coupling lens and an objective optical element has been reduced. In contrast to this, the former one representing an optical element made of plastic resin can be manufactured at low cost, which is a merit, and is used widely in recent years. However, the refractive index of the plastic material is sharply lowered by the temperature changes, resulting in a problem that the optical performance is seriously changed. This rate of the change by temperature is sometimes about 10 times the rate of the change in glass material.

Incidentally, for reproducing (reading) information at high speed or for recording information at high speed, it is necessary to increase an amount of light for forming a light-converged spot securely.

The most simple way for that purpose is to raise an amount of light emitted by a diode by increasing power of a laser diode, in which, however, heat is generated and working temperature also rises sharply. Thus, the refractive index of the plastic material is lowered as stated above, resulting in a problem that the designed optical performance cannot be attained.

Further, in the operations at high speed, an actuator works at high speed, and thereby, heat is further generated, and changes in refractive index of the optical element are caused, which is a problem.

Therefore, there are proposed various technologies to restrain changes in optical performance of the plastic optical element for temperature changes.

In Japanese Un-examined Patent Application Publication No. H11-337818, there is described an objective lens for an optical head wherein changes in wavefront aberration caused by temperature changes can be controlled to be small, and a range of usable temperature can be broadened even in the case of using as an objective lens with high NA. Specifically, the objective lens is a single lens made of resin whose both surfaces are convex and aspheric, and a diffractive lens structure representing a pattern of ring-shaped zones whose center is on the optical axis is formed on a lens surface on one side. The diffractive structure has a spherical aberration characteristic wherein spherical aberration changes in the direction toward insufficient correction when a wavelength of incident light is shifted to the longer wavelength side.

However, when providing the diffractive structure, there are various problems in the courses from processing of a die for injection molding to the actual injection molding, which causes a cost increase.

Further, when replacing an optical disc of a certain type with that of another type, the diffractive structure is used for correcting spherical aberration caused by a difference between substrate thickness or a difference between working wavelength, on one occasion, and the diffractive structure is used for correcting chromatic aberration caused by a change of a working wavelength resulting from temperature changes, on another occasion.

Under the aforesaid condition, it is not allowed to use the diffractive structure only for correcting temperatures, and the degree of freedom in design for each point is lowered. In the case of the temperature correction and correction of spherical aberration, in particular, the direction for correcting spherical aberration caused by changes for the former is opposite to that for the latter, which sometimes causes butting in design.

SUMMARY

In view of the aforementioned problems in the conventional technologies, aspects of the invention are to provide an optical element wherein a change of the refractive index for temperatures is extremely small, to provide an optical pickup device utilizing the optical element and to provide a producing method of the optical element.

The aspects of the invention can be achieved by the following structures.

(1) An optical element for an optical pickup device, wherein the optical element is produced by molding a resin material, in which inorganic particles having a diameter of not more than 30 nm are dispersed in a plastic resin.

(2) The optical element of the above described Item (1), wherein when a change in a refractive index of the plastic resin due to a temperature change is represented by $dn_1/dt_1$, and when a change in a refractive index of the inorganic particle due to a temperature change is represented by $dn_2/dt_2$, a sign of $dn_1/dt_1$ and a sign of $dn_2/dt_2$ are different from each other.

(3) An optical element of the above described Item (1) or (2), wherein at least an optical surface of the optical element is an optical functional surface including a fine structure having a predetermined optical function.

(4) The optical element of the above described Item (3), wherein the optical pickup device is capable of recording information to and/or reproducing information from a first optical information recording medium comprising a first protective substrate having a thickness of t1, and is capable of recording information to and/or reproducing information from a second optical information recording medium comprising a second protective substrate having a thickness of t2, which is smaller than t1, and wherein the optical functional surface compensates a spherical aberration generated due to a difference between a thickness of the first protective substrate and the thickness of the second protective substrate.

(5) The optical element of the above described Item (3), wherein the optical pickup device comprises the optical element, a first light source emitting a first light flux having a wavelength of $\lambda 1$, and a second light source emitting a second light flux having a wavelength of $\lambda 2$, which is longer than $\lambda 1$, wherein the optical pickup device is capable of recording information to and/or reproducing information from a first optical information recording medium with utilizing the first light flux, and is capable of recording information to and/or reproducing information form a second optical information recording medium with utilizing the second light flux, and wherein the optical functional surface compensates an aberration generated due to a difference between the wavelength $\lambda 1$ of the first light flux and the wavelength $\lambda 2$ of the second light flux.

(6) The optical element of the above described Item (5), wherein the difference between the wavelength $\lambda 1$ and the wavelength $\lambda 2$ is not less than 50 nm.

(7) The optical element of the above described Item (3), wherein the optical pickup device comprises the optical element and a first light source emitting a first light flux having a wavelength of $\lambda 1$, wherein the optical pickup device is capable of recording information to and/or reproducing information from a first optical information recording medium with utilizing the first light flux, and the optical functional surface compensates an aberration generated due to a wavelength variation from $\lambda 1$ of the first light flux emitted by the first light source.

(8) The optical element of the above described Item (7), wherein an amount of the wavelength variation from $\lambda 1$ of the first light flux emitted by the first light source is not more than 5 nm.

(9) The optical element of the above-described Item (3), wherein the optical functional surface includes an optical path difference-generating structure.

(10) The optical element of the above described Item (9), wherein the optical path difference-generating structure is a diffractive structure.

(11) The optical element of the above described Item (10), wherein the diffractive structure is a saw tooth-shape diffractive structure.

(12) The optical element of the above described Item (10), wherein the diffractive structure is a superposition-type diffractive structure.

(13) The optical element of the above described Item (9), wherein the optical path difference-generating structure is a phase difference-generating structure.

(14) The optical element of the above described Item (9), wherein the optical path difference-generating structure is a non-periodic phase structure.

(15) The optical element of any one of above described Items (1) to (14), wherein the optical element satisfies the following conditions:

$$|A| < 8 \times 10^{-5}$$

wherein A represents a value shown by the following expression;

$$A = \frac{(n^2+2)(n^2-1)}{6n}\left\{(-3a) + \frac{1}{[R]}\frac{\partial [R]}{\partial t}\right\}$$

wherein α represents the coefficient of linear expansion and [R] represents the molecular refraction.

(16) The optical element of the above described Item (15), wherein the optical element satisfies the following condition.

$$|A| < 6 \times 10^{-5}$$

(17) The optical element of claim 15, wherein the optical element satisfies the following condition.

$$|A| < 10 \times 10^{-4}$$

(18) The optical element of any one of the above described Items (1) to (17), wherein the inorganic particles are an inorganic oxide.

(19) The optical element of the above described Item 18, wherein the inorganic oxide is in a saturated oxidation state.

(20) The optical element of any one of the above described Items (1) to (19), wherein at least one surface of the optical element is a refractive surface.

(21) The optical element of the above described Item (20), wherein the refractive surface is an aspherical surface.

(22) The optical element of any one of the above described Items (1) to (21), wherein the resin material comprises an antioxidant.

(23) The optical element of any one of the above described Items (1) to (22), wherein a volume ratio of the plastic resin and the inorganic particles is 9:1 to 3:2.

(24) The optical element of any one of the above described Items (1) to (23), wherein the optical element comprises the inorganic particles in an amount of 5 to 80 weight % of the total weight of the optical element.

(25) The optical element of any one of the above described Items (1) to (24), wherein a temperature difference of the pickup device between during use and during nonuse is not less than 5° C. and not more than 50° C.

(26) The optical element of any one of the above described Items (1) to (25), wherein the optical element is an objective optical element.

(27) The optical element of any one of the above described Items (1) to (26), wherein the optical element is a beam shaper.

(28) The optical element of any one of the above described Items (1) to (25), wherein when an incident light flux having a Gaussian distribution enters onto the optical element, the optical element emits a light flux having a light intensity distribution, which is different from the Gaussian distribution of the incident light flux.

(29) The optical element of the above described Item (28), wherein the optical element emits a light flux having an approximately uniform light intensity distribution.

(30) The optical element of the above described Item (28), wherein the optical element makes a light intensity of a light flux emitted from the outermost part of the optical element 45% to 90% of a light intensity of a light flux emitted from a paraxial part of the optical element.

(31) An optical pickup device comprising:
at least a light source; and
the optical element of any one of the above described Items (1) to (30).

(32) A producing method of an optical element, comprising the steps of:
obtaining a resin material by dispersing inorganic particles having a diameter of not more than 30 nm into a plastic resin, which is in a melting state; and
obtaining the optical element by casting the resin material into a mold with keeping the melting state.

(33) A producing method of an optical element, comprising the steps of:
obtaining a resin material by dispersing inorganic particles into a plastic resin; and
obtaining the optical element by conducting a projection molding to the resin material with utilizing a mold, which includes a core made of a metallic material and a plating layer formed on the core.

BRIEF DESCRIPTION OF THE DRAWINGS

FIG. 2(*b*) is a cross-section diagram of another example of an optical element having a saw tooth-shape diffractive structure.

FIG. 3(*b*) is a cross-section diagram of another example of an optical element having a stepwise-shape diffractive structure.

FIG. 4(*b*) is a cross-section diagram of another example of an optical element having a non-periodic phase structure (NPS).

FIG. 5(*b*) is a cross-section diagram of another example of an optical element having superposition-type diffractive structure.

FIG. 6(*b*) is a cross-section diagram of another example of an optical element having a comb tooth-shape diffractive structure.

PREFERRED EMBODIMENTS OF THE INVENTION

Figure 1:
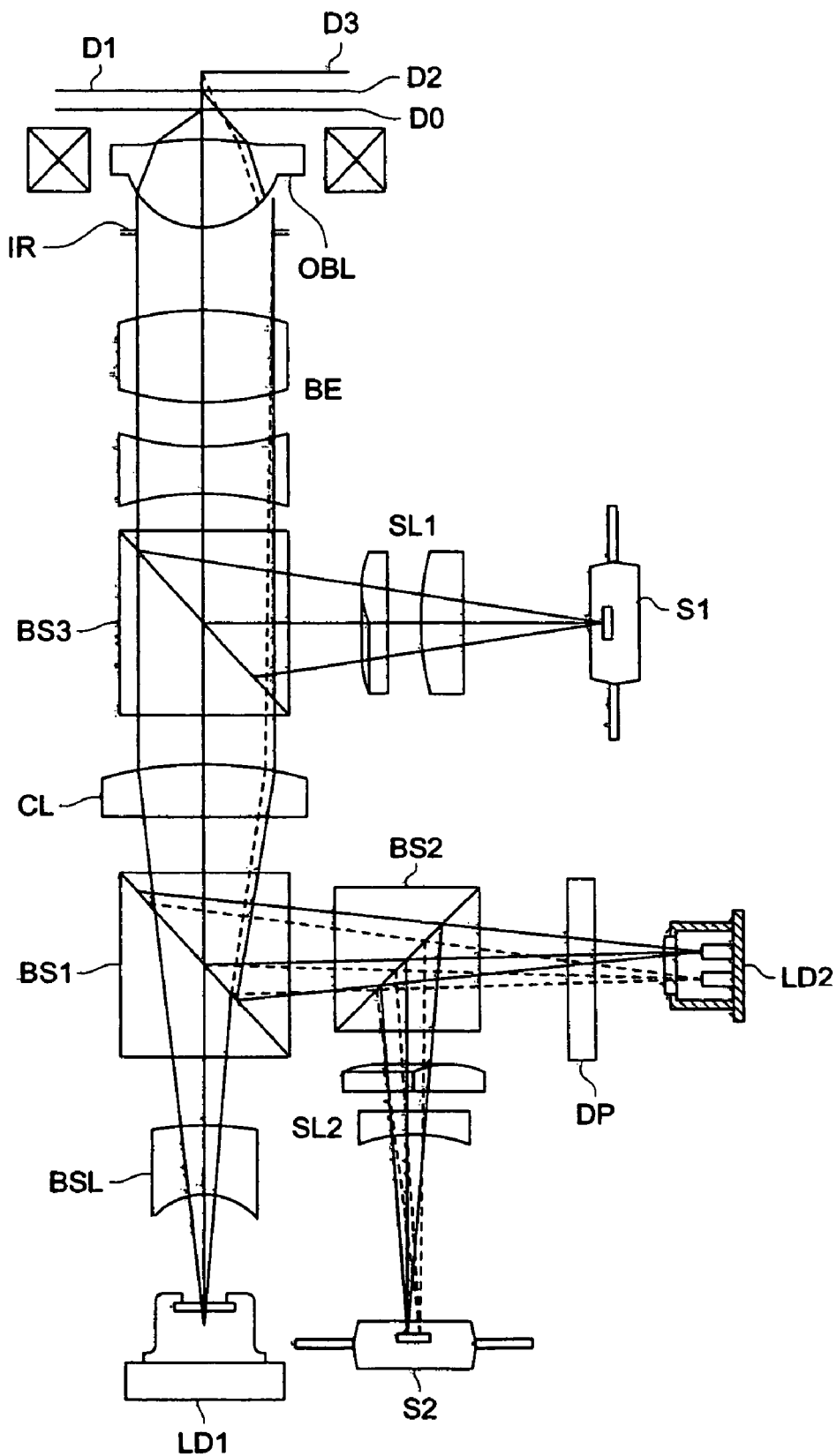
FIG. 1 is a diagram of an optical pickup device relating to the invention.

In general, when fine powder is mixed with transparent resin material, light scattering is caused and transmittance is lowered, which made it difficult to use it as an optical material. However, it has become clear that occurrence of scattering can be prevented actually by making the fine powder to be smaller than a wavelength of a transmitted light flux.

Though the refractive index of plastic resin is lowered when a temperature rises, the refractive index of most of inorganic particles is enhanced when a temperature rises. Therefore, it is possible to prevent occurrence of changes in refractive index by combining the aforesaid properties so that both properties may cancel each other. The optical element of the invention is made of a material wherein inorganic particles each being in a size of 30 nanometers or less, preferably in a size of 20 nanometers or less, and more preferably in a size of 10-15 nanometers or less are dispersed in a plastic resin representing a resin material. It is therefore possible to provide an optical element wherein temperature dependence of refractive index is zero or extremely low.

The addition amount of inorganic particles to a plastic material in the present invention can be appropriately adjusted in view of required abilities and is not specifically limited. However, the addition amount of inorganic particles is preferably not less than 5 weight % and not more than 80 weight % based on the total weight.

In the present invention, an optical element can be obtained by ejection molding of plastic resin, into which inorganic particles of a nanometer-level having been added, however, improvement of the ability (improvement of an athermal property) may not be achieved sufficiently when the addition amount of inorganic particles is less than the aforesaid range.

Further, on the contrary, an ejection molding property may become poor or the weight as an optical element may increase resulting in deterioration of the ability as a resin material (an ejection molding material) when the addition amount is over the aforesaid range. Further, there may be caused a problem of such as yellowing around the particles at the time of molding.

The inventors of this invention have been able to specify the aforesaid preferable range in view of such as a refractive index, a temperature dependence of the refractive index, properties of inorganic particles and a molding property of mixed resins, with respect to a variety of resins.

The effect of an athermal property differs depending on the value of dn/dt characteristic of inorganic particles, however, improving effect of an athermal property can be obtained by adding inorganic particles of not less than 5 weight %. In the case of utilizing inorganic particles such as PLZT and LiNbO₃, the addition of not less than 5 weight % can reduce dn/dt of the resin by approximately not less than 10%, which results in decreasing the necessity to correct aberration variations due to temperature changes. Therefore, freedom of an optical design can be increased.

On the other hand, increase of the specific gravity is depressed by making the addition amount of inorganic particles not more than 80 weight %. Particularly, in the case that an optical element is one of a type driven in an optical pick-up device, increase of electricity consumption by a driving member (an actuator) due to the weight increase can be depressed resulting in depressing generation of high temperature due to increased electricity consumption.

In an optical element of this invention, the sign of dn/dt of resin is possible to be reversed by adjusting the addition amount of inorganic particles. That is, it is possible to make the refractive index will increase according to the temperature of an optical element increases. For example, in the case of dispersing inorganic particles comprising LiNbO₃ in acrylic resin, it is possible to reverse the sign of dn/dt by setting the addition amount of the inorganic particles in acrylic resin to not less than 40 weight %. Since an optical element having such a constitution may provide excessive correction against temperature changes, refractive index changes may be compensated each other by being combined with another optical element comprising ordinary resin. In an optical system, by making a part of optical elements to exhibit excessive correction, refractive index changes due to temperature changes can be compensated as a total system even without making every optical elements athermal.

For example, a resin material for a base material of the optical element of the invention can be attained by dispersing fine-grains of niobium oxide (Nb₂O₅) into an acrylic resin.

A volume ratio of plastic resin representing a basic material is about 80 and that of niobium oxide is about 20, and these are mixed uniformly. Though fine-grains have a problem to cohere easily, it is possible to generate the state of necessary dispersion by a technology to provide electric charges to the surface of a grain for dispersion.

As stated later, it is preferable to conduct mixing and dispersion of resin and grains on an in-line basis in the course of injection molding of optical elements. In other words, it is preferable that the resin and grains are neither cooled nor solidified until they are formed to be an optical element, after they are mixed and dispersed.

Incidentally, it is possible to raise or lower the volume ratio properly for controlling the rate of change of the refractive index for temperatures, and to blend plural types of inorganic particles each being in a nanometer size to disperse them.

With respect to the volume ratio, though it is 80:20, namely, 4:1 in the aforesaid example, it can be adjusted properly within a range of 90:10 (9:1) to 60:40 (3:2). If the particles are less exceeding the ratio of 9:1, an effect of restraining temperature changes becomes smaller, and when the ratio exceeds 3:2 on the contrary, moldability of resin becomes problematic, which is not preferable.

Inorganic Particle

As being described above, inorganic particles are utilized in the invention, the fine-grains are preferably inorganic matters, and they are oxides more preferably. It is preferable that the oxides are saturated in terms of the state of oxidization, and they are not oxidized any more.

Inorganic particles utilized in this invention have a mean particle diameter of not more than 30 nm and preferably not less than 1 nm. Since dispersion of particles is difficult when it is less than 1 nm, which may result in that desired abilities may not be obtained, while when the mean particle diameter is over 30 nm, the obtained thermoplastic material composition may become turbid to decrease transparency possibly resulting in a light transmittance of less than 70%. Herein, a mean particle diameter refers to a diameter of an equivalent volume sphere.

The shape of inorganic particles utilized in this invention is not specifically limited, but particles having a spherical shape are preferably utilized. Further, distribution of the particle diameter is not also specifically limited, but particles having a relatively narrow distribution rather than having a broad distribution are preferably utilized, with respect to exhibiting the effects of this invention more efficiently.

Inorganic particles utilized in this invention include, for example, inorganic oxide particles. More specifically, preferably listed are, for example, titanium oxide, zinc oxide, aluminum oxide, zirconium oxide, hafnium oxide, niobium oxide, tantalum oxide, magnesium oxide, calcium oxide, strontium oxide, barium oxide, yttrium oxide, lanthanum oxide, cerium oxide, indium oxide, tin oxide, lead oxide; complex oxide compounds thereof such as lithium niobate, potassium niobate and lithium tantalate; and phosphate salts and sulfate salts comprising combinations with these oxides; and specifically preferably utilized are niobium oxide and lithium niobate.

Further, as inorganic particles of this invention, fine particles of a semiconductor crystal composition can also be preferably utilized. Said semiconductor crystal compositions are not specifically limited, but desirable are those generate no absorption, emission and phosphorescence in a wavelength range employed as an optical element. Specific composition examples include simple substances of the 14th group elements in the periodic table such as carbon, silica, germanium and tin; simple substances of the 15th group elements in the periodic table such as phosphor (black phosphor); simple substances of the 16th group elements in the periodic table such as selenium and tellurium; compounds comprising a plural number of the 14th group elements in the periodic table such as silicon carbide (SiC); compounds of an element of the 14th group in the periodic table and an element of the 16th group in the periodic table such as tin oxide (IV) ($SnO_2$), tin sulfide (II, IV) ($Sn(II)Sn(IV)S_3$), tin sulfide (IV) ($SnS_2$), tin sulfide (II) (SnS), tin selenide (II) (SnSe), tin telluride (II) (SnTe), lead sulfide (II) (PbS), lead selenide (II) (PbSe) and lead telluride (II) (PbTe); compounds of an element of the 13th group in the periodic table and an element of the 15th group in the periodic table (or III-V group compound semiconductors) such as boron nitride (BN), boron phosphide (BP), boron arsenide (BAs), aluminum nitride (AlN), aluminum phosphide (AlP), aluminum arsenide (AlAs), aluminu antimonide (AlSb), gallium nitride (GaN), gallium phosphide (GaP), gallium arsenide (GaAs), gallium antimonide (GaSb), indium nitride (InN), indium phophide (InP), indium arsenide (InAs) and indium antimonide (InSb); compounds of an element of the 13th group in the periodic table and an element of the 16th group in the periodic table such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide (InSe) and indium telluride ($In_2Te_3$); compounds of an element of the 12th group in the periodic table and an element of the 16th group in the periodic table (or II-VI group compound semiconductors) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe) and mercury telluride (HgTe); compounds of an element of the 15th group in the periodic table and an element of the 16th group in the periodic table such as arsenic sulfide (III) ($As_2S_3$), arsenic selenide (III) ($As_2Se_3$), arsenic telluride (III) ($As_2Te_3$), antimony sulfide (III) ($Sb_2S_3$), antimony selenide (III) ($Sb_2Se_3$), antimony telluride (III) ($Sb_2Te_3$), bismuth sulfide (III) ($Bi_2S_3$), bismuth selenide (III) ($Bi_2Se_3$) and bismuth telluride (III) ($Bi_2Te_3$); compounds of an element of the 11th group in the periodic table and an element of the 16th group in the periodic table such as copper oxide (I) ($Cu_2O$) and copper selenide (I) ($Cu_2Se$); compounds of an element of the 11th group in the periodic table and an element of the 17th group in the periodic table such as copper chloride (I) (CuCl), copper bromide (I) (CuBr), copper iodide (I) (CuI), silver chloride (AgCl) and silver bromide (AgBr); compounds of an element of the 10th group in the periodic table and an element of the 16th group in the periodic table such as nickel oxide (II) (NiO); compounds of an element of the 9th group in the periodic table and an element of the 16th group in the periodic table such as cobalt oxide (II) (CoO) and cobalt sulfide (II) (CoS); compounds of an element of the 8th group in the periodic table and an element of the 16th group in the periodic table such as triiron tetraoxide ($Fe_3O_4$) and iron sulfide (II) (FeS); compounds of an element of the 7th group in the periodic table and an element of the 16th group in the periodic table such as manganese oxide (II) (MnO); compounds of an element of the 6th group in the periodic table and an element of the 16th group in the periodic table such as molybdenum sulfide (IV) ($MOS_2$) and tungsten oxide(IV) ($WO_2$); compounds of an element of the 5th group in the periodic table and an element of the 16th group in the periodic table such as vanadium oxide (II) (VO), vanadium oxide (IV) ($VO_2$) and tantalum oxide (V) ($Ta_2O_5$); compounds of an element of the 4th group in the periodic table and an element of the 16th group in the periodic table such as titanium oxide (such as $TiO_2$, $Ti_2O_5$, $Ti_2O_3$ and $Ti_5O_9$); compounds of an element of the 2th group in the periodic table and an element of the 16th group in the periodic table such as magnesium sulfide (MgS) and magnesium selenide (MgSe); chalcogen spinels such as cadmium oxide (II) chromium (III) ($CdCr_2O_4$), cadmium selenide (II) chromium (III) ($CdCr_2Se_4$), copper sulfide (II) chromium (III) ($CuCr_2S_4$) and mercury selenide (II) chromium (III) ($HgCr_2Se_4$); and barium titanate ($BaTiO_3$). Further, semiconductor clusters structures of which are established such as $Cu_{146}Se_{73}$(triethylphosphine)$_{22}$, described in Adv. Mater., vol. 4, p.494 (1991) by G. Schmid, et al., are also listed as examples.

These fine particles may be utilized one kind of inorganic particle alone or in combination of plural types of the inorganic particles.

Manufacturing Method of Inorganic Particles and Surface Modification

A manufacturing method of inorganic particles of this invention is not specifically limited and any commonly known method can be employed. For example, desired oxide particles can be obtained by utilizing metal halogenides or alkoxy metals as starting materials which are hydrolyzed in a reaction system containing water. At this time, also employed is a method in which such as an organic acid or an organic amine is simultaneously utilized to stabilize the particles. More specifically, for example, in the case of titanium dioxide particles, employed can be a well known method described in Journal of Physical Chemistry vol. 100, pp. 468-471 (1996). According to these methods, for example, titanium dioxide having a mean particle diameter of 5 nm can be easily manufactured by utilizing titanium tetraisopropoxide or titanium tetrachloride as a starting material in the presence of an appropriate additive when being hydrolyzed in an appropriate solvent. Further, inorganic particles of this invention are preferably modified on their surface. A method to modify the particle surface is not specifically limited and any commonly known method can be employed. For example, there is a method in which the particle surface is modified by hydrolysis in the presence of water. In this method, catalysts such as acid and alkali are suitably utilized, and it is generally considered that hydroxyl groups on the particle surface and hydroxyl groups having been generated by hydrolysis of a surface modifying agent form bonds by dehydration. Surface modifying agents preferably utilized in this invention include, for example, tetramethoxysilane, tetraehtoxysilane, tetraisopropoxysilane, tetraphenoxysilane, methyltrimethoxysilane, ethyltrimethoxysilane, propyltrimethoxysilane, methyltriethoxysilane, methyltriphenoxysilane, ethyltriethoxysilane, phenyltrimethoxysilane, 3-methylphenyltrimethoxysilane, dimethyldimethoxysilane, diethyldiethoxysilane, diphenyldimethoxysilane, diphenyldiphenoxysilane, trimethylmethoxysilane, triethylethoxysilane, triphenymethoxysilane and triphenylphenoxysilane. These compounds have different characteristics such as a reaction speed, and utilized may be a compound suitable for the conditions of surface modification. Further, one type may be utilized or plural types may be utilized in combination. Since the properties of obtained inorganic particles may differ depending on the utilized compound, affinity for the thermoplastic resin utilized to prepare a material composition can be promoted by selecting the compound being employed for the surface modification. The degree of surface modification is not specifically limited, and preferably 10-99 weight % and more preferably 30-98 weight % based on fine particles after surface modification.

When the fine-particles are inorganic materials, reaction with plastic resin representing high molecular organic compounds can be controlled to be low, which is preferable. Further, when they are oxides, deterioration caused by use can be prevented. Under the severe conditions such as high temperatures and irradiation of a laser beam, in particular, oxidization tends to be accelerated. However, deterioration by oxidization can be prevented by fine-grains representing the inorganic oxides.

Further, it is preferable to add antioxidant for preventing oxidization of resin resulted from other dominant causes.

Plastic Resin

Plastic resin utilized in an optical element of this invention is transparent plastic resin commonly utilized. For example, resins described in Japanese Un-examined Patent Application Publication Nos. 2002-308933, 2002-309040 and 2002-308964 can be appropriately employed. Specifically, listed are acrylic resin, cyclic olefin resin, polycarbonate resin, polyester resin, polyether resin, polyamide resin and polyimide resin.

As plastic resin utilized in an optical element of this invention, specifically preferably utilized is polymers provided with an alicyclic structure.

In particular, listed is acrylic resin, polycarbonate resin provided with an alicyclic chain, polyester resin provided with an alicyclic chain, polyether resin provided with an alicyclic chain, polyamide resin provided with an alicyclic chain or polyimide resin provided with an alicyclic chain. More specifically, for example, listed are resins provided with a structural skeleton represented by chemical structures (1)-(14) described in following Table 1, however this invention is not limited thereto.

TABLE 1

| Chemical structure | Structure | Refractive index n | Abbe's number ν |
|---|---|---|---|
| (1) | 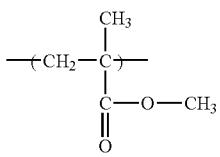 | 1.49 | 58 |
| (2) | 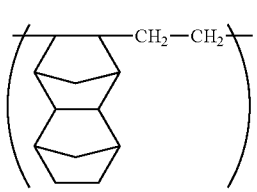 | 1.54 | 56 |
| (3) | 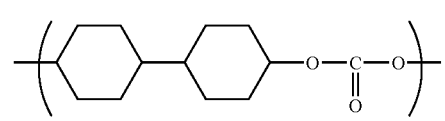 | 1.53 | 57 |
| (4) | 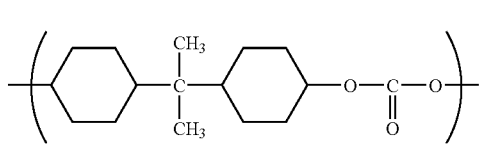 | 1.51 | 58 |
| (5) | 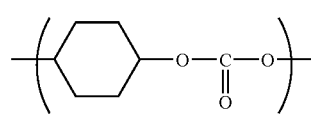 | 1.52 | 57 |
| (6) | 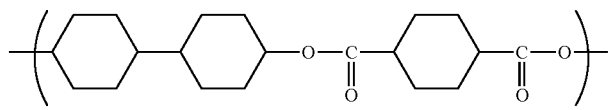 | 1.54 | 55 |

TABLE 1-continued

| Chemical structure | Structure | Refractive index n | Abbe's number ν |
|---|---|---|---|
| (7) | | 1.53 | 57 |
| (8) | | 1.55 | 57 |
| (9) | | 1.54 | 57 |
| (10) | | 1.55 | 58 |
| (11) | | 1.55 | 53 |
| (12) | | 1.54 | 55 |
| (13) | | 1.54 | 56 |
| (14) | | 1.58 | 43 |

Polymers provided with an alicyclic structure are more preferably alicyclic hydrocarbon type copolymers which contain repeating unit (a) provided with an alicyclic structure represented by following general formula (1) and repeating unit (b) comprising a chain structure represented by following general formula (2) and/or (3) so as to make the sum content of not less than 90 weight %, and, further, make the content of repeating unit (b) not less than 1 weight % and less than 10 weight %.

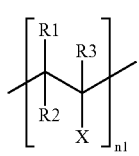

General formula (1)

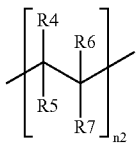

General formula (2)

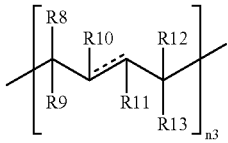

General formula (3)

In formula (1), X represents an alicyclic hydrocarbon group, R1-R13 in general formula (1), (2) and (3) each independently represent a hydrogen atom, a chain hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group). Among them, a hydrogen atom or a chain hydrocarbon group having a carbon number of 1-6 is preferred because of excellent heat resistance and a low water absorbing property. Halogen atoms include a fluorine atom, a chlorine atom, a bromine atom and an iodine atom. Chain hydrocarbon groups substituted by a polar group include, for example, a halogenated alkyl group having a carbon number of 1-20, preferably of 1-10 and more preferably of 1-6. Chain hydrocarbon groups include, for example, an alkyl group having a carbon number of 1-20, preferably of 1-10 and more preferably of 1-6; and alkenyl group having a carbon number of 2-20, preferably of 2-10 and more preferably of 2-6.

X in general formula (1) represents an alicyclic hydrocarbon group, and the carbon number constituting which is generally 4-20, preferably 4-10 and more preferably 5-7. By setting the carbon number constituting an alicyclic structure into this range, double refraction can be reduced. Further, an alicyclic structure may include not only a monocyclic structure but also polycyclic structures such as a norbornane ring and a dicyclohexane ring.

The alicyclic hydrocarbon group may be provided with a carbon-carbon unsaturated bond, however, the content is not more than 10%, preferably not more than 5% and more preferably not more than 3%, based on the total carbon-carbon bonds. By setting the content of carbon-carbon unsaturated bonds of an alicyclic hydrocarbon group into this range, transparency and heat resistance are improved. Further, to carbon atoms constituting an alicyclic hydrocarbon group, bonded may be such as a hydrogen atom, a hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group). Among them, a hydrogen atom or a chain hydrocarbon group having a carbon number of 1-6 is preferred because of excellent heat resistance and a low water absorbing property.

Further, . . . in general formula (3) represents a carbon-carbon saturated bond or a carbon-carbon unsaturated bond, and the content of an unsaturated bond is generally not more than 10%, preferably not more than 5% and more preferably not more than 3%, based on the total carbon-carbon bonds constituting the main chain, when transparency and heat resistance are strongly required.

Among repeating units represented by general formula (1), the repeating units represented by general formula (4) is excellent with respect to heat resistance and a low water absorbing property.

General Formula (4)

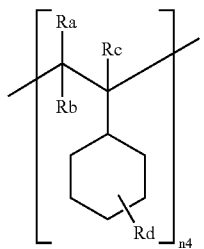

Among repeating units represented by general formula (2), the repeating units represented by general formula (5) is excellent with respect to heat resistance and a low water absorbing property.

General formula (5)

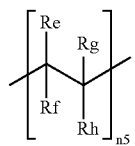

Among repeating units represented by general formula (3), the repeating units represented by general formula (6) is excellent with respect to heat resistance and a low water absorbing property.

General formula (6)

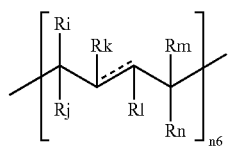

Ra, Rb, Rc, Rd, Re, Rf, Rg, Rh, Ri, Rj, Rk, Rl, Rm, and Rn in general formula (4), (5) and (6) each independently represent a hydrogen atom or a lower chain hydrocarbon group, and hydrogen atom or a lower alkyl group having a carbon number of 1-6 is preferred due to excellent with respect to heat resistance and low water absorbability.

Among repeating units of a chain structure represented by general formula (2) and (3), the repeating units of a chain structure represented by general formula (3) exhibits a more excellent strength property of obtained hydrocarbon type polymer.

In this invention, the sum content of repeating unit (a) provided with an alicyclic structure represented by general formula (1) and repeating unit (b) provided with a chain structure represented by general formula (2) and/or general formula (3), in hydrocarbon copolymer, is generally not less than 90%, preferably not less than 95% and more preferably not less than 97%, based on weight. By setting the sum content into the aforesaid range, low double refraction, heat resistance, low water absorbability and mechanical strength are highly suitably balanced.

The content of repeating unit (b) provided with a chain structure in an alicyclic hydrocarbon type copolymer is appropriately selected depending on the objective of application, however, is generally in a range of 1-10%, preferably of 1-8% and more preferably of 2-6%, based on weight. When the content of repeating unit (b) is in the aforesaid range, low double refraction, heat resistance and low water absorbability are highly suitably balanced.

Further, a chain length of repeating unit (a) is sufficiently short compared to a molecular chain length of an alicyclic hydrocarbon type copolymer, and specifically A is in a range of not more than 30% of B, preferably not more than 20%, more preferably not more than 15% and most preferably not more than 10%, when A=(a weight average molecular weight of a repeating unit chain provided with an alicyclic structure) and B=(a weight average molecular weight of an alicyclic hydrocarbon type copolymer (Mw)×(a number of repeating units provided with an alicyclic structure/a number of the whole repeating unit constituting an alicyclic hydrocarbon type copolymer)). Low double refraction is inferior when A is out of this range.

Further, a chain length of repeating unit (a) preferably has a specific distribution. Specifically, A/C is preferably in a range of not less than 1.3, more preferably 1.3-8 and most preferably 1.7-6, when A=(a weight average molecular weight of a repeating unit chain provided with an alicyclic structure) and C=(a number average molecular weight of a repeating unit chain provided with an alicyclic structure). A blocking degree increases when A/C is excessively small while a random degree increases when A/C is excessively large and low double refraction is inferior in the both cases.

The molecular weight of an alicyclic hydrocarbon type copolymer is in a range of 1,000-1,000,000, preferably 5,000-500,000, more preferably 10,000-300,000 and most preferably 50,000-250,000 as a polystyrene (or polyisoprene) equivalent weight average molecular weight which is measured by means of gel permeation chromatography (hereinafter, referred to as GPC). A strength property of the molded material is inferior when the weight average molecular weight of an alicyclic hydrocarbon type copolymer is excessively small, while the double refraction of the molded material become large when it is excessively too large.

The molecular weight distribution of such copolymers can be appropriately selected depending on the objective of the application, however, it is generally in a range of not more than 2.5, preferably not more than 2.3 and more preferably not more than 2, as a ratio (Mw/Mn) of a polystyrene (or polyisoprene) equivalent weight average molecular weight which is measured by means of GPC (Mw) to a number average molecular weight (Mn). Mechanical strength and heat resistance can be highly suitably balanced when Mw/Mn is in this range.

The glass transition temperature (Tg) of the copolymer may be suitably selected depending on the objective of the application, however, is generally 50-250° C., preferably 70-200° C. and more preferably 90-180° C.

Manufacturing Method of Alicyclic Hydrocarbon Type Copolymer

Manufacturing method of alicyclic hydrocarbon type copolymer of this invention includes (1) a method in which aromatic vinyl type compound and another copolymerizable monomer are copolymerized and carbon-carbon unsaturated bonds of the main chain and of aromatic ring are hydrogenated; and (2) a method in which alicyclic vinyl type compound and another copolymerizable monomer are copolymerized and the resulting product is appropriately hydrogenated.

In the case of manufacturing an alicyclic hydrocarbon type copolymer of this invention according to the aforesaid method, it can be efficiently prepared by hydrogenating carbon-carbon unsaturated bonds in the main chain and unsaturated rings such as an aromatic or a cycloalkene ring of a copolymer, which is a copolymer of an aromatic vinyl type compound and/or an alicyclic vinyl type compound (a') and copolymerizable another monomer (b') and a repeating unit arising from compound (a') in the copolymer is provided with a chain structure in which D is not more than 30% of E, preferably not more than 20%, more preferably not more than 15% and most preferably not more than 10%, when D=(the weight average molecular weight of a repeating unit chain arising from an aromatic vinyl type compound and/or an alicyclic vinyl type compound) and E=(the weight average molecular weight of hydrocarbon type copolymer (Mw)×(the number of a repeating unit chain arising from an aromatic vinyl type compound and/or an alicyclic vinyl type compound/the total number of repeating unit constituting a hydrocarbon type copolymer)). The low double refraction property of the obtained alicyclic hydrocarbon type copolymer is inferior when D is out of the aforesaid range.

In this invention, method (1) is preferred to prepare an alicyclic hydrocarbon type copolymer more efficiently.

Copolymers before the above-described hydrogenation is further preferably have D/F in a definite range when F=(a number average molecular weight of a repeating unit chain arising from an aromatic vinyl type compound and/or an alicyclic vinyl type compound). Specifically, D/F is preferably in a range of not less than 1.3, more preferably 1.3-8 and most preferably 1.7-6. The low double refraction property of the obtained alicyclic hydrocarbon type copolymer is inferior when D/F is out of this range.

The weight average molecular weight and number average molecular weight of a repeating unit arising from the aforesaid compound (a') can be determined, for example, by a method, described in Macromolecules, vol. 16, pp. 1925-1928 (1983), in which unsaturated double bonds in an aromatic vinyl type copolymer are reductive cleaved after having been subjected to ozone addition and the molecular weight of obtained aromatic vinyl chain is measured.

The molecular weight of a copolymer before hydrogenation is in a range of 1,000-1,000,000, preferably 5,000-500,000 and more preferably 10,000-300,000, as a polystyrene (or polyisoprene) equivalent weight average molecular weight which is measured by means of GCP. A strength property of the obtained alicyclic hydrocarbon type copolymer is inferior when the weight average molecular weight (Mw) of the copolymer is excessively small, while the hydrogenation reactivity is inferior when it is excessively large.

Specific examples of aromatic vinyl type compounds utilized in above-described method (1) include, for example, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenylstyrene, and such as styrene, 2-methylstyrene, 3-methylstyrene and 4-methylstyrene are preferable.

Specific examples of alicyclic vinyl type compounds utilized in above-described method (2) include, for example, cyclobutylethylene, cyclopentylethylene, cyclohexylethylene, dicycloheptylethylene, cyclooctylethylene, nolbonylethylene, dicyclohexylethylene, α-methylcyclohexylethylene, α-t-butylcyclohexylethylene, cyclopentenylethylene, cyclohexenylethylene, cyclobutenylethylene, cyclooctenylethylene, cyclodecenylethylene, nolbonenylethylene, α-methylcyclohexenylethylene and α-t-butylcyclohexenylethylene, and cyclohexylethylene and α-methylcyclohexylethylene are preferable among them.

These aromatic vinyl type compounds and alicyclic vinyl type compounds can be utilized alone or in combination of two or more types.

Copolymerizable another monomers are not specifically limited, and utilized are such as chain vinyl compounds and chain conjugated diene compounds. In the case of utilizing chain conjugated diene compounds, the operating properties in the manufacturing process is superior, as well as the strength property of obtained alicyclic hydrocarbon type copolymer is excellent.

Specific examples of chain vinyl compounds include, for example, chain olefin monomers such as ethylene, propylene, 1-butene, 1-pentene and 4-methyl-1-pentene; nitrile type monomers such as 1-cyanoethylene (acrylonitrile), 1-cyano-1-methylethylene (methacrylonitrile) and 1-cyano-1-chloroethylene (α-chloroacrylonitrile), (meth)acrylic acid ester type monomers such as 1-(methoxycarbonyl)-1-methylethylene (methacrylic acid methyl ester), 1-(ethoxycarbonyl)-1-methylethylene (methacrylic acid ethyl ester), 1-(propoxycarbonyl)-1-methylethylene (methacrylic acid propyl ester), 1-(butoxycarbonyl)-1-methylethylene (methacrylic acid butyl ester), 1-methoxycarbonylethylene (acrylic acid methyl ester), 1-ethoxycarbonylethylene (acrylic acid ethyl ester), 1-propoxycarbonylethylene (acrylic acid propyl ester) and 1-butoxycarbonylethylene (acrylic acid butyl ester); unsaturated fatty acid type monomers such as 1-carboxyethylene (acrylic acid), 1-carboxy-1-methylethylene (methacrylic acid) and maleic anhydride, preferable are chain olefin monomers and most preferable are ethylene, propylene and 1-butene.

Conjugated dienes include, for example, 1,3-butadiene, isoprene, 2,3-dimethyl-1,3-butadiene, 1,3-pentadiene and 1,3-hexadiene. Among these chain vinyl compounds and chain conjugated dienes, preferable are chain conjugated dienes and specifically preferable are butadiene and isoprene. These chain vinyl compounds and chain conjugated dienes each can be utilized alone or in combination of two or more types.

A method to polymerize compounds (a') is not specifically limited and includes such as a one-step polymerization method (a batch method) and a monomer successive addition method (a method in which, after starting polymerization by using a part of the whole using amount of the monomer, polymerization is proceeded by successively adding the residual monomer). In particular, a hydrocarbon type copolymer provided with a preferable chain structure can be prepared by employing a monomer successive addition method. A copolymer before hydrogenation has the more random structure, the smaller is the aforesaid D, and/or the larger is the D/F. How much degree of random structure a copolymer has, is determined by a rate ratio of a polymerization rate of aromatic vinyl compound to that of copolymerizable another monomer, and the smaller is this rate ratio, the chain structure of more random structure has the copolymer.

According to the aforesaid monomer successive addition method, since uniformly mixed monomers are successively added into the polymerization system, it is possible to more decrease the polymerization selectivity of monomer in a polymer growth process by polymerization, different from a batch method, resulting in more random chain structure of the obtained copolymer. Further, the polymerization temperature can be stably maintained low because accumulation of polymerization reaction heat in the polymerization system is small.

In the case of a monomer successive addition method, polymerization is started by addition of an initiator in the state that generally 0.01-60 weight %, preferably 0.02-20 weight % and more preferably 0.05-10 weight % among the total using amount of the monomer presents as an initial monomer in a polymerization reaction vessel in advance. By setting the amount of the initial monomer in such a range, easily removed can be reaction heat generated in the initial reaction after starting polymerization resulting in preparation of a copolymer having a more random chain structure.

By continuing the reaction until a polymerization conversion ratio of the aforesaid monomer reaches to not less than 70%, preferably not less than 80% and more preferably not less than 90%, preparation of a copolymer having a more random chain structure results. Thereafter, the residual portion of the aforesaid monomer is discontinuously added to the reaction system, and the addition rate is determined in view of consumption rate of the monomer in the polymerization system.

The addition of the residual monomer is adjusted to finish in a range of 0.5-3 times, preferably 0.8-2 times and more preferably 1-1.5 times, of a time duration given by a relation $[(100-I) \times T/I]$, when a required time until the polymerization conversion ratio of the initial monomer reaches to 90% is T, and the ratio (%) of the initial monomer to the total monomer utilized is I. Specifically, the addition rates of the initial monomer and of the residual monomer are determined so that the addition time duration of the residual monomer is in a range of generally 0.1-30 hours, preferably 0.5-5 hours and more preferably 1-3 hours. Further, a polymerization conversion ratio of the total monomer immediately after the finish of the monomer addition is generally not less than 80%, preferably not less than 85% and more preferably not less than 90%. By setting a polymerization conversion ratio of the total monomer immediately after the finish of the monomer addition to the aforesaid range, obtained copolymer have a more random chain structure.

The polymerization method includes such as radical polymerization, anion polymerization and cation polymerization, and is not specifically limited. However, anion polymerization is preferred in view of polymerization operation, easiness of a hydrogenation reaction in the post process and mechanical strength of a finally obtained hydrocarbon type copolymer.

In the case of radical polymerization, block polymerization, solution polymerization, suspension polymerization and emulsion polymerization in the presence of an initiator, in a temperature range of generally 0-200° C. and preferably 20-150° C. can be employed, and in particular, in the case of prevention of impurity mixing in resin is required, block polymerization and suspension polymerization are preferred. As a radical initiator, utilized can be organic peroxides such as benzoyl peroxide, lauroyl peroxide and t-butyl-peroxy-2-ethylhexaate, azo compounds such as azobisbutyronitrile, 4,4-azobis-4-cyanopenoic acid and azodibenzoyl, water-soluble catalysts exemplified by potassium persulfate and ammonium persulfate and redox initiators.

In the case of anion polymerization, block polymerization, solution polymerization and slurry polymerization in the presence of an initiator, in a temperature range of generally 0-200° C., preferably 20-100° C. preferably and specifically preferably 20-80° C. can be employed, however, solution polymerization is preferred in view of removal of reaction heat. In this case, an inert solvent which can dissolve the polymer and the hydrogenation product thereof is utilized. Inert solvents utilized in solution reaction include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized alone or in combination of two or more types, and are utilized at a ratio of 200-10,000 weight parts against 100 weight parts of the total using monomers.

As an initiator for the anion polymerization described above, usable are, for example, mono organolithium compounds such as n-butyl lithium, sec-butyl lithium, t-butyl lithium, hexyl lithium and phenyl lithium; and multi-functional organolithium compounds of such as dilithiomethane, 1,4-dilithiobutane and 1,4-dilithio-2-ethylcyclohexane.

In polymerization reaction, a polymerization accelerator and a randomizer (an additive to prevent a chain of certain one component from becoming long) can also be utilized. In the case of anion polymerization, for example, a Lewis base compound can be utilized as a randomizer. Specific examples of a Lewis base compound include, for example, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

Polymers obtained according to the above radical polymerization or anion polymerization can be recovered by means of commonly known methods such as a steam stripping method, a direct desolvation method and an alcohol coagulation method. Further, at the time of polymerization, in the case of utilizing an inert solvent in hydrogenation reaction, the polymer is not recovered from polymerization solution but can be supplied into hydrogenation process as it is.

Hydrogenation Method of Unsaturated Bond

In the case of performing hydrogenation of carbon-carbon double bonds in an unsaturated ring such as an aromatic ring and a cycloalkene ring or unsaturated bonds in a main chain of in copolymers before hydrogenation, the reaction method and reaction form are not specifically limited, and can be performed according to commonly known method. However, preferred is a hydrogenation method which can increase a hydrogenation degree as well as decrease a polymer chain cleaving reaction caused simultaneously with the hydrogenation, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminums such as diethylaluminum chloride and ethylaluminum dichloride; and alkylaluminum hydrides such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenated catalysts can be utilized each alone or in combination of two or more types, and the using amount is generally 0.01-100 parts preferably 0.05-50 parts and more preferably 0.1-30 parts, based on weight against the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneously with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation rate of thus obtained hydrogenated compounds is generally not less than 90%, preferably not less than 95% and more preferably not less than 97%, based on 1H-NMR measurement, with respect to any of carbon-carbon unsaturated bonds of a main chain, carbon-carbon double bonds of an aromatic ring and carbon-carbon double bonds of an unsaturated ring. Such as a low double refraction property and thermal stability are deteriorated when the hydrogenation rate is low.

A method to recover a hydrogenated compound after finishing the hydrogenation reaction is not specifically limited. Generally, utilized can be a method in which the solvent is removed from the hydrogenated compound solution by means of direct drying after elimination of the residue of a hydrogenation catalyst by means of such as filtration and centrifugal separation, and a method in which the hydrogenated compound solution is poured into a poor solvent for the hydrogenated compound to coagulate the hydrogenated compound.

Polymers provided with an alicyclic structure is further preferably block copolymers provided with poloymer block [A] and poloymer block [B]. Polymer block [A] contains repeating unit [1] represented by following formula (1). The content of repeating unit [1] in polymer block [A] is preferably not less than 50 mol %, more preferably not less than 70 mol % and most preferably not less than 90 mol %.

Formula (1)

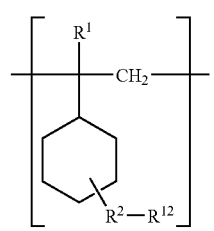

(in the formula, $R^1$ represents a hydrogen atom or an alkyl group having a carbon number of 1-20, $R^2$-$R^{12}$ each independently represent a hydrogen atom, an alkyl group having a carbon number of 1-20, a hydroxyl group, an alkoxy group having a carbon number of 1-20 or a halogen group. Herein, the aforesaid $R^2$-$R^{12}$ are $R^2$, $R^3$, $R^4$, $R^5$, $R^6$, $R^7$, $R^8$, $R^9$, $R^{10}$, $R^{11}$ and $R^{12}$. Hereinafter, it is similar.)

A preferable structure of repeating unit [1] represented by above formula (1) is one in which $R^1$ is a hydrogen atom or a methyl group and all of $R^2$-$R^{12}$ are hydrogen atoms. The transparency and mechanical strength are superior when the content of repeating unit [1] in polymer block [A] is in the above range. In polymer block [A], the residual parts except aforesaid repeating unit [1] are repeating units arising from chain conjugated dienes or chain vinyl compounds which have been hydrogenated.

Polymer block [B] contains aforesaid repeating unit [1] and repeating unit [2] represented by following formula (2) and/or [3] represented by following formula (3). The content of repeating unit [1] in polymer block [B] is preferably 40-95 mol % and more preferably 50-90 mol %. The transparency and mechanical strength are superior when the content of repeating unit [1] is in the above range. When a mol fraction of repeating unit [2] in polymer block [B] is m2 (mol %) and a mol fraction of repeating unit [3] is m3 (mol %), 2×m3+m2 is preferably not less than 2 mol %, more preferably 5-60 mol % and most preferably 10-50 mol %.

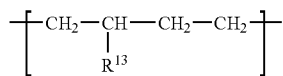

Formula (2)

(in the formula, $R^{13}$ represents a hydrogen atom or an alkyl group having a carbon number of 1-20.)

A preferable structure of repeating unit [2] represented by above formula (2) is one in which $R^{13}$ is a hydrogen atom or a methyl group.

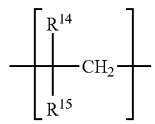

Formula (3)

(in the formula, $R^{14}$ and $R^{15}$ each independently represent a hydrogen atom or an alkyl group having a carbon number of 1-20.)

A preferable structure of repeating unit [3] represented by above formula (3) is one in which $R^{14}$ is a hydrogen atom and $R^{15}$ is a methyl group or an ethyl group.

The mechanical strength is decreased when the content of aforesaid repeating unit [2] or repeating unit [3] in polymer block [B] is excessively small. Therefore, transparency and mechanical strength are superior when the content of repeating unit [2] and repeating unit [3] is in the above range. Polymer block [B] may contain repeating unit [X] represented by following formula (X). The content of repeating unit [X] is in a range not to damage the characteristics of a block copolymer of this invention, and is preferably not more than 30 mol % and more preferably not more than 20 mol %, based on the total block copolymer.

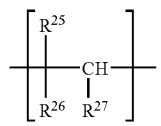

Formula (X)

(in the formula, $R^{25}$ represents a hydrogen atom or an alkyl group having a carbon number of 1-20, $R^{26}$ represents a nitrile group, an alkoxycarbonyl group, a formyl group, a hydroxycarbonyl group or a halogen group, and $R^{27}$ represents a hydrogen atom. $R^{25}$ and $R^{27}$ may represent an acid anhydride group or an imido group by bonding to each other.)

Further, polymer block [B] utilized in this invention preferably satisfy the relationship of a>b, when the mol fraction of repeating unit [1] in polymer block [A] is a, and the mol fraction of repeating unit [1] in polymer block [B] is b. Thereby, transparency and mechanical strength are superior.

Further, with respect to block copolymer utilized in this invention, the ratio ma/mb is preferably 5/95-95/5, more preferably 30/70-70/30 and most preferably 40/60-60/40, when a mol number of total repeating units constituting block [A] is ma and a mole number of total repeating units constituting block [B] is mb. Mechanical strength and heat resistance are superior when ma/mb is in the above range.

The molecular weight of an block copolymer utilized in this invention is preferably in a range of 10,000-300,000, more preferably 15,000-250,000 and most preferably 20,000-200,000 as a polystyrene (or polyisoprene) equivalent weight average molecular weight (hereinafter, described as Mw) which is measured by means of gel permeation chromatography employing tetrahydrofuran (THF) as a solvent. The balance of mechanical strength, heat resistance and a molding property is superior when Mw of a block copolymer is in the above range.

The molecular weight distribution of a block copolymer can be appropriately selected depending on the objective of the application, however, it is preferably not more than 5, more preferably not more than 4 and most preferably not more than 3, as a ratio (Mw/Mn) of a polystyrene (or polyisoprene) equivalent weight average molecular weight which is measured by means of GCP (hereinafter referred to as Mw) to a number average molecular weight (Mn). Mechanical strength and heat resistance are superior when Mw/Mn is in this range.

The glass transition temperature (Tg) of the copolymer may be suitably selected depending on the objective of the application, however, is preferably 70-200° C., more preferably 80-180° C. and most preferably 90-0.160° C., as a high temperature side value measured by a differential scanning type thermal analyzer (hereinafter, described as DSC).

The above-described block copolymer utilized in this invention is provided with polymer block [A] and polymer block [B], and may be any of a di-block copolymer of ([A]-[B]) form, a tri-block copolymer of ([A]-[B]-[A]) or ([B]-[A]-[B]) and a block copolymer in which at least 4 blocks of polymer-block [A] and polymer block [B] are bonded alternately. Further, it may be a block copolymer in which these blocks are bonded in a radial form.

Block copolymers utilized in this invention can be obtained by the following methods. Listed is a method in which a polymer block having a repeating unit arising from an aromatic vinyl compound and/or an alicyclic vinyl compound, and a polymer block having a repeating unit arising from a vinyl type monomer are prepared by polymerizing a mixture of a monomer mixture containing an aromatic vinyl compound and/or an alicyclic vinyl compound, and a monomer mixture containing a vinyl type monomer (except aromatic vinyl compounds and alicyclic vinyl compounds), followed by hydrogenation of aromatic rings and/or aliphatic rings in said block copolymers. Further, listed is a method in which a monomer mixture containing a saturated alicyclic vinyl compound and a vinyl type monomer (except aromatic vinyl compounds and alicyclic vinyl compounds) are polymerized to prepare block copolymer having a repeating unit arising from an alicyclic vinyl compound and a repeating unit arising from a vinyl type compound. Among them, more preferable to obtain a block copolymer of this invention is, for example, the following method.

(1) In the first method, first, polymer block [A'] containing a repeating unit arising from an aromatic vinyl compound and/or an alicyclic vinyl compound which has unsaturated bonds in the ring is prepared by polymerizing a monomer mixture [a'] containing not less than 50 mol % of an aromatic vinyl compound and/or an alicyclic vinyl compound which has unsaturated bonds in the ring. Polymer block [B'] is prepared by polymerizing a monomer mixture [b'] which contains-not less than 2 mol % of a vinyl type monomer (except aromatic vinyl compounds and alicyclic vinyl compounds), and containing an aromatic vinyl compound and/or an alicyclic vinyl compound which has unsaturated bonds in the ring at a ratio less than that in monomer mixture [a']. After preparing a block copolymer provided with aforesaid polymer block [A'] and polymer block [B'] via at least these process, aromatic rings and/or alicyclic rings in said block copolymer are hydrogenated.

(2) In the second method, first, polymer block [A] containing a repeating unit arising from an saturated alicyclic vinyl compound by polymerizing a monomer mixture containing not less than 50 mol % of an saturated alicyclic vinyl compound. Polymer block [B] containing a repeating unit arising from a saturated alicyclic vinyl compound and a repeating unit arising from a vinyl monomer is prepared by polymerizing a monomer mixture [b] which contains not less than 2 mol % of a vinyl type monomer (except aromatic vinyl compounds and alicyclic vinyl compounds), and containing a saturated alicyclic vinyl at a ratio less than that in monomer mixture [a]. A block copolymer provided with aforesaid polymer block [A] and polymer block [B] via at least these process.

Among the above methods, above-described method (1) is more preferred, with respect to easy availability of monomers, polymerization yield, easiness of introducing a repeating unit [1] into polymer block [B'].

Specific examples of aromatic vinyl compounds in above method (1) include such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 4-t-butylstyrene, 5-t-butyl-2-methylstyrene, monochlorostyrene, dichlorostyrene, monofluorostyrene and 4-phenylstyrene, as well as those having substituents such as a hydroxyl group and an alkoxy group therein. Among them, preferable are such as 2-methylstyrene, 3-methylstyrene and 4-methylstyrene.

Specific examples of unsaturated alicyclic vinyl compounds in above method (1) include such as cyclohexenyl ethylene, α-methylcyclohexenyl ethylene and α-t-butylcyclohexenyl ethylene, as well as those having substituents such as a halogen group, an alkoxy group or a hydroxyl group therein.

These aromatic vinyl compounds and alicyclic vinyl compounds can be utilized each alone or in combination of two or more types. However, it is more preferable, in this invention, to utilize an aromatic vinyl compound in either of monomer mixtures of [a'] and [b'], and, in particular, more preferable to utilize α-methylstyrene.

Vinyl monomers utilized in the above method include chain vinyl compounds and chain conjugated diene compounds.

Specific examples of chain vinyl compounds include chain olefin monomers such as ethylene, propylene, 1-butene, 1-pentene and 4-mthyl-1-pentene, and, among them, most preferable are ethylene, propylene and 1-butene.

Chain conjugated diene compounds include, for example, 1,3-butadiene, isoprene, 2,3-dimethyl-1,3-butadiene, 1,3-pentadiene and 1,3-hexadiene. Chain conjugated dienes, among these chain vinyl compounds and chain conjugated dienes, are preferred, and butadiene and isoprene are most preferred. These chain vinyl compounds and chain conjugated dienes can be utilized each alone or in combination of two or more types.

In the case of utilizing a monomer mixture containing the above-described monomers, a polymerization reaction may be performed by means of any polymerization method such as radial polymerization, anion polymerization or cation polymerization, and preferably by means of anion polymerization and most preferably by means of living anion polymerization in the presence of an inert solvent.

Anion polymerization is performed in the presence of a polymerization initiator in a temperature range of generally 0-200° C., preferably 20-100° C. and most preferably 20-80° C. As initiators, utilized can be, for example, mono-organolithium compounds such as n-butyl lithium, sec-butyl lithium, t-butyl lithium, hexyl lithium and phenyl lithium; and multifunctional organolithium compounds such as dilithiomethane, 1,4-dilithiobutane and 1,4-dilithio-2-ethylcyclohexane.

Inert solvents utilized include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized each alone or in combination of two or more types, and are utilized at a ratio of 200-10,000 weight parts against 100 weight parts of the total using monomers.

At the time of polymerizing each polymer block, a polymerization accelerator or a randomizer can be utilized to prevent a certain one component chain from growing long. In particular, in the case of performing a polymerization reaction by means of anion polymerization, such as a Lewis base compound can be utilized as a randomizer. Specific examples of a Lewis base compound include, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

A method to preparation a block copolymer by means of living anion polymerization includes commonly known methods such as a consecutive addition polymerization reaction method and a coupling method, and in this invention, a consecutive addition polymerization reaction method is preferably employed.

In the case of preparing the above block copolymer provided with polymer block [A'] and polymer block [B'] by means of a consecutive addition polymerization method, a process to obtain polymer block [A'] and a process to obtain polymer block [B'] are performed successively in order. Specifically, in an inert solvent, polymer block [A'] is prepared by polymerizing monomer mixture [a'] in the presence of the above-described living anion polymerization catalyst, and polymer block [B'] connected to polymer block [A'] is prepared by continuing polymerization by successively adding monomer mixture [b'] into the reaction system. Further, if desired, monomer mixture [a'] is added to perform polymerization resulting in preparation of a tri-block substance by connecting polymer block [A'], then monomer mixture [b'] is further added to perform polymerize resulting in preparation of a tetra-block substance.

The obtained block copolymer is recovered by means of commonly known methods such as a steam stripping method, a direct desolvation method and an alcohol coagulation method. Further, at the time of polymerization, in the case of utilizing an inert solvent in a hydrogenation reaction, it is not necessary to recover the polymer from polymerization solution because the polymerization solution can be utilized in the hydrogenation process as it is.

Block copolymers provided with polymer block [A] and polymer block [B'], which is prepared by aforesaid method (1), are preferably those having a repeating unit of the following structure.

Preferable polymer block [A'] constituting block copolymer of before hydrogenation is a polymer block containing not less than 50% of repeating unit [4] represented by the following formula (4).

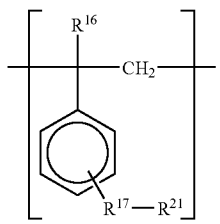

Formula (4)

(in the formula, $R^{16}$ represents a hydrogen atom or an alkyl group having a carbon number of 1-20, $R^{17}$-$R^{11}$ each independently represent a hydrogen atom, an alkyl group having a carbon number of 1-20, a hydroxyl group, an alkoxy group having a carbon number of 1-20 or a halogen group. Herein, the aforesaid $R^{17}$-$R^{21}$ represent $R^{17}$, $R^{18}$, ... and $R^{21}$.)

Further, preferable polymer block [B'] necessarily contains the aforesaid-repeating unit [4], and provided with at least either one of repeating unit [5] represented by following formula (5) or repeating unit [6] represented by following formula (6). Further, a'>b', when mol fraction of repeating unit [4] in polymer block [A'] is a' and mol fraction of repeating unit [4] in polymer block [B'] is b'.

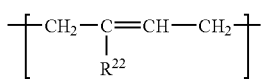

Formula (5)

(in the formula, $R^{22}$ represents a hydrogen atom or an alkyl group having a carbon number of 1-20.)

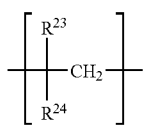

Formula (6)

(in the formula, $R^{23}$ represents a hydrogen atom or an alkyl group having a carbon number of 1-20, and $R^{24}$ represents a hydrogen atom or an alkyl group or an alkenyl group having a carbon number of 1-20)

Further block [B'] may contain repeating unit [Y] represented by following formula (Y).

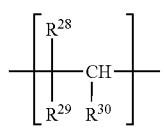

Formula (Y)

(in the formula, $R^{28}$ represents a hydrogen atom or an alkyl group having a carbon number of 1-20, $R^{29}$ represents a nitrile group, an alkoxycarbonyl group, a formyl group, hydroxycarbonyl group or a halogen group, or $R_{29}$ and $R_{30}$ may form an acid anhydride group or an imido group by bonding to each other.)

Further, a preferable block copolymer before hydrogenation is one having ratio ma'/mb' of preferably 5/95-95/5, more preferably 30/70-95/5 and most preferably 40/60-90/10, when a mol number of total repeating units constituting block [A'] is ma' and a mole number of total repeating units constituting block [B'] is mb'. The mechanical strength and heat resistance are superior when ma'/mb' is in the above range.

The molecular weight of a block copolymer before hydrogenation is preferably in a range of 12,000-400,000, more preferably 19,000-350,000 and most preferably 25,000-300,000 as a polystyrene (or polyisoprene) equivalent Mw which is measured by means of GCP employing THF as a solvent. Mechanical strength is decreased when Mw of a block copolymer is excessively small while hydrogenation degree is decreased when Mw of a block copolymer is excessively large.

The molecular weight distribution of a block copolymer before hydrogenation can be appropriately selected depending on the objective of the application, however, it is preferably not more than 5, more preferably not more than 4 and most preferably not more than 3, as a ration (Mw/Mn) of a polystyrene (or polyisoprene) equivalent molecular weight Mw to Mn, which are measured by means of GCP. The hydrogenation degree is improved when Mw/Mn is in this range.

The Tg of a block copolymer before hydrogenation may be suitably selected depending on the objective of the application, however, is preferably 70-150° C., more preferably 80-140° C. and most preferably 90-130° C., as a high temperature side value measured by means of DSC.

The reaction method and reaction form of performing hydrogenation of carbon-carbon unsaturated bonds in an unsaturated ring of such as an aromatic ring and a cycloalkene ring and unsaturated bonds in a main chain or a side chain, in the aforesaid block copolymer before hydrogenation, are not specifically limited, and can be performed according to commonly known methods. However, preferred is a hydrogenation method which can increase a hydrogenation degree as well as decrease a polymer chain cleaving reaction, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminum such as diethylaluminum chloride and ethylaluminum dichloride; and hydrogenated alkylaluminum such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenation catalysts can be utilized each alone or in combination of two or more types, and the using amount is generally 0.01-100 weight parts preferably 0.05-50 weight parts and more preferably 0.1-30 weight parts, per 100 weight parts of the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneous with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation degree of thus obtained hydrogenated compounds is preferably not less than 90%, more preferably not less than 95% and most preferably not less than 97%, based on $^1$H-NMR measurement, with respect to both of carbon-carbon unsaturated bonds of a main chain and a side chain, and carbon-carbon unsaturated bonds of an aromatic ring or a cycloalkene ring. Such as a low double refraction property and thermal stability of an obtained copolymer are deteriorated when the hydrogenation degree is low.

After finishing the hydrogenation reaction, the block copolymer can be recovered by such as a method in which the solvent is removed by means of direct drying after elimination of a hydrogenation catalyst from the reaction solution by means of such as filtration and centrifugal separation, and a method in which the hydrogenated compound solution is poured into a poor solvent for the hydrogenated compound to coagulate the hydrogenated compound.

In the aforesaid polymer according to this invention, various types of compounding ingredients can be appropriately blended. Compounding ingredients which can be blended in a block copolymer are not specifically limited and include stabilizers such as an antioxidant, a thermal stabilizer, a light fastness stabilizer, a weather-proofing stabilizer, a UV absorbent and an infrared absorbent; resin modifiers such as a sliding agent and a plastisizer; colorants such as dye and pigment; anti-static agents, non-flammable agents and fillers. These compounding ingredients can be utilized alone or in combination of two or more types, and the blending amount is selected in a range not disturbing the effects of this invention.

In this invention, it is preferable to blend an anti-oxidant, a UV absorbent and a light fastness stabilizer among the above compounding ingredients in a polymer. Anti-oxidants include such as phenol type anti-oxidants, phosphor type anti-oxidants and sulfur type anti-oxidants, and phenol type anti-oxidants, specifically alkyl-substituted phenol type anti-oxidants, are preferable among them. By blending these anti-oxidants, prevented can be coloring or strength decrease of a lens, due to oxidation deterioration at the time of molding, without deterioration of the transparency and heat resistance. These anti-oxidants can be utilized alone or in combination of two or more types, and the blending amount is selected in a range not disturbing the effects of this invention. It is preferably 0.001-5 weight parts and more preferably 0.01-1 weight parts, against 100 weight parts of the polymer.

UV absorbents include benzophenone type UV absorbents such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane; and benzotriazole type UV absorbents such as 2-(2'-hydroxy-5'-methylphenyl) benzotriazole, 2-(2H-benzotriazole-2-il)-4-methyl-6-(3,4,5, 6-tetrahydrophthalimidylmethyl)phenol, 2-(2H-benzotriazole-2-il)-4,6-bis(1-methyl-1-phenylethyl)phenol, 2-(2'-hydroxy-3'5'-di-tertiary-butylphenyl)benzotriazole, 2-(2'-hydroxy-3'-tertiary-butyl-5'-methylphenyl)-5-chlorobenzotriazole, 2-(2'-hydroxy-5'-tertiary-octylphenyl) benzotriazole, 2-(2'-hydroxy-3'5'-di-tertiary-amylphenyl) benzotriazole, 2-[2'-hydroxy-3'-(3",4",5",6"-tetrahydrophthalimidomethyl)-5'-methylphenyl] benzotriazole and 2,2'-methylenebis[4-(1,1,3,3-tetramethylbutyl)-6-(2H-benzotriazle-2-il)phenol]. Among them, preferable are 2-(2'-hydroxy-5'-methylphenyl)benzotriazole, 2-(2H-benzotriazole-2-il)-4-methyl-6-(3,4,5,6-tetrahydrophthalimidylmethyl)phenol and 2-(2H-benzotriazole-2-il)-4,6-bis(1-methyl-1-phenylethyl)phenol, with respect to such as heat resistance and low volatility.

Light fastness stabilizers include benzophenone type light fastness stabilizers, benzotriazole type light fastness stabilizers and hindered amine type light fastness stabilizers, and, in this invention, preferably utilized are hindered amine type light fastness stabilizers, with respect to transparency and an anti-coloring property of a lens. Among hindered amine type light fastness stabilizers (hereinafter, abbreviated as a HALS), those having a polystyrene equivalent Mn, measured by means of GPC employing THF as a solvent, of preferably 1000-10000, more preferably 2000-5000 and most preferably 2800-3800. When Mn is excessively small, a predetermined amount may not be blended due to evaporation at the time of blending said HALS in a polymer by thermal fusion kneading, or foams and silver streaks may generate at the time of thermal fusion molding in the ejection molding, resulting in decrease of manufacturing stability. Further, volatile gases may be generated from a lens when the lens is used for a long period keeping an on-state of a lamp. On the contrary, when Mn is excessively large, the dispersibility of HALS in a block copolymer is decreased to decrease transparency of a lens which results in deterioration of the improvement effect of light fastness. Therefore, in this invention, obtained can be lenses exhibiting excellent manufacturing stability, low gas generation and transparency by setting Mn of HALS in the above range.

Specific examples of such a HALS include high molecular weight HALS in which a plural number of piperidine rings are bonded via a triazine skeleton such as N,N',N'',N'''-tetrakis-[4,6-bis-{butyl-(N-methyl-2,2,6,6-tetramethylpiperidine-4-il)amino}-triazine-2-il]-4,7-diazadecane-1,10-diamine, a polycondensation compound of dibutylamine, 1,3,5-triazine and N,N'-bis(2,2,6,6-tetramethyl-4-piperidyl)butylamine, poly[{(1,1,3,3-tetramethylbutyl)amino-1,3,5-triazine-2,4-diil}{(2,2,6,6-tetramethyl-4-piperidyl)imino}hexamethylene{(2,2,6,6-tetramethyl-4-piperidyl)imino}], a polycondensation compound of 1,6-hexadiamine-N,N'-bis(2,2,6,6-tetramethyl-4-piperidyl) and morphorine-2,4,6-trichloro-1,3,5-triazine and poly[(6-morphorino-s-triazine-2,4-diil)(2,2,6,6-tetramethyl-4-piperidyl)imino]-hexamethylene[((2,2,6,6-tetramethyl-4-piperidyl)imino]; high molecular weight HALS in which a piperidine rings are bonded via a ester bonding such as a polymerization compound of dimethylsuccinate and 4-hydroxy-2,2,6,6-tetramethyl-1-piperidineethanol, a mixed esterified compound of 1,2,3,4-butanetetracarboxylic acid, 1,2,2,6,6-pentamethyl-4-piperidinol and 3,9-bis(2-hydroxy-1,1-dimethyl)-2,4,8,10-tetraoxasupiro[5,5]undecane.

Among them, preferred are polymers having Mn of 2000-5000, such as a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazie-2,4-diil}{(2,2,6,6-tetramethyl-4-piperidyl)imino}hexamethylene{(2,2,6,6-tetramethyl-4-piperidyl)imino}], a polymerization compound of dimethylsuccinate and 4-hydroxy-2,2,6,6-tetramethyl-1-piperidineethanol.

The blending amount of UV absorbent and HALS described above in a block copolymer according to this invention is preferably 0.01-20 weight parts, more preferably 0.02-15 weight parts and most preferably 0.05-10 weight perts based on 100 weight parts of the polymer compound. The improvement effect of light fastness may not be obtained sufficiently resulting in coloring in such as the case of long period outdoor use, when the addition amount is excessively small. While, when the blending amount of HALS is excessively large, a part of the HALS may be converted to a gas to be generated, or dispersibility of the HALS may be decreased, resulting in decrease of transparency of a lens.

Further, by blending a soft polymer having the lowest glass transition temperature of not higher than 30° C., it is possible to prevent turbidity under an environment of high temperature and high humidity for a long period without deteriorating such as transparency, heat resistance and mechanical strength.

Specific examples of the above soft polymers include olefin type soft polymer such as polyethylene, polypropyrene, ethylene-α-olefin copolymer and ethylene-propyrene-diene copolymer (EDPM); isobutylene type soft copolymers such as polyisobutylene, isobutylene-isoprene rubber and isobutylene-styrene copolymer; diene type soft copolymers such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene-block copolymer, styrene-butadiene-styrene•block copolymer, isoprene-styrene•block copolymer and styrene-isoprene-styrene•block copolymer; silicon containing type soft polymers such as dimethyl polysiloxane and diphenyl polysiloxane; acryl type soft polymers such as polybutyl acrylate, polybutyl methacrylate and polyhydroxyethyl methacrylate; epoxy type soft polymers such as polyethyleneoxide, polypropyreneoxide and epichlorohydrine rubber; fluoride type soft polymers such as fluorovinyl type rubber and tetrafluoroethylene-propyrene rubber; other soft polymers such as natural rubber, polypeptide, protein, polyester type thermal plastic elastomers, vinylchloride type elastomers and polyamido type tnermoplastic elastomers. These soft elastomer may be provided with a crosslinking structure or introduced with a functional group by a modification reaction.

Diene type soft polymers are preferred among the soft polymers described above, and, in particular, hydrogenated compounds, in which carbon-carbon unsaturated bonds of said soft polymers are hydrogenated, are superior with respect to rubber elasticity, mechanical strength, flexibility and dispersibility. The blending amount of a soft polymer differs depending on types of the compound, however, generally, the glass transition temperature or transparency may be decreased remarkably resulting in being unusable as a lens when the blending amount is too large. While turbidity of a molded product may generates under high temperature and high humidity when the blending amount is excessively small. The blending amount is preferably 0.01-10 weight parts, more preferably 0.02-5 weight parts and specifically preferably 0.05-2 weight parts against 100 weight parts of the block copolymer.

An optical element for an optical pickup device in the invention preferably has an optical functional surface including a fine structure having a predetermined optical function on at least an optical surface of the optical element. Since the optical element in the invention can reduce a change in a refractive index due to a temperature change by the resin material itself, it is not necessary to compensate the change in refractive index due to temperature change by the fine structure itself formed on the optical functional surface, and thus, the optical functional surface can be designed for compensating an aberration generated due to another factor.

When the optical pickup device, in which the optical element of the invention is used, is an optical pickup device being capable of recording information to and/or reproducing information from a first optical information recording medium comprising a first protective substrate having a thickness of t1, and is capable of recording information to and/or reproducing information from a second optical information recording medium comprising a second protective substrate having a thickness of t2, which is smaller than t1, designing the optical functional surface of the optical element to compensate a spherical aberration generated due to a difference between a thickness of the first protective substrate and the thickness of the second protective substrate is a preferable structure of the invention.

When the optical pickup device, in which the optical element of the invention is used, is an optical pickup device comprising the optical element, a first light source emitting a first light flux having a wavelength of $\lambda 1$, and a second light source emitting a second light flux having a wavelength of $\lambda 2$, which is longer than $\lambda 1$, and being capable of recording information to and/or reproducing information from a first optical information recording medium with utilizing the first light flux, and is capable of recording information to and/or reproducing information form a second optical information recording medium with utilizing the second light flux, designing the optical functional surface of the optical element to compensate an aberration generated due to a difference between the wavelength $\lambda 1$ of the first light flux and the wavelength $\lambda 2$ of the second light flux is a preferable structures of the invention. In this case, it is more preferable that the difference between the wavelength $\lambda 1$ and $\lambda 2$ is not less than 50 nm.

When the optical pickup apparatus, in which the optical element of the invention is used, is an optical pickup apparatus comprising the optical element and a first light source emitting a first light flux having a wavelength of λ1, and being capable of recording information to and/or reproducing information from a first optical information recording medium with utilizing the first light flux, designing the optical functional surface of the optical element to compensate an aberration generated due to a wavelength variation from λ1 of the first light flux emitted by the first light source is a preferable structure of the invention.

It is preferable that the optical element of the invention has an optical path difference generating structure on the optical functional surface. The optical path difference generating structure in the present invention represents a structure comprising a central region including an optical axis and plural ring-shaped zones, which are divided by fine steps and are positioned around the central region, and represents a structure, which gives an optical path difference to the incident light fluxes being incident to the adjacent ring-shaped zones. It is possible to give the above-described predetermined optical function to the optical element by the optical path difference generating structure.

Figure 2:
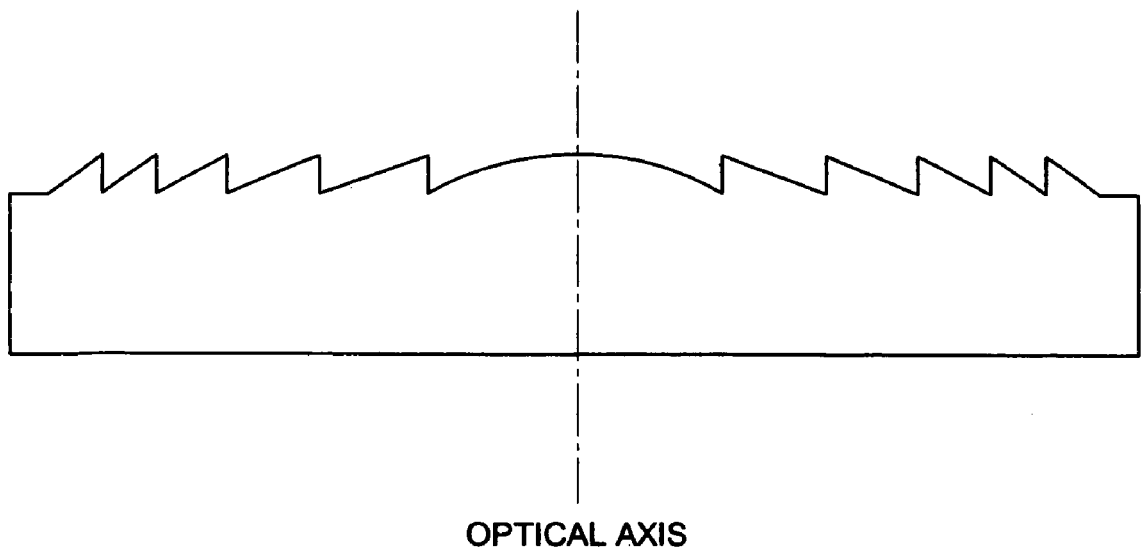
FIG. 2(*a*) is a cross-section diagram of an example of an optical element having a saw tooth-shape diffractive structure.
Figure 2:
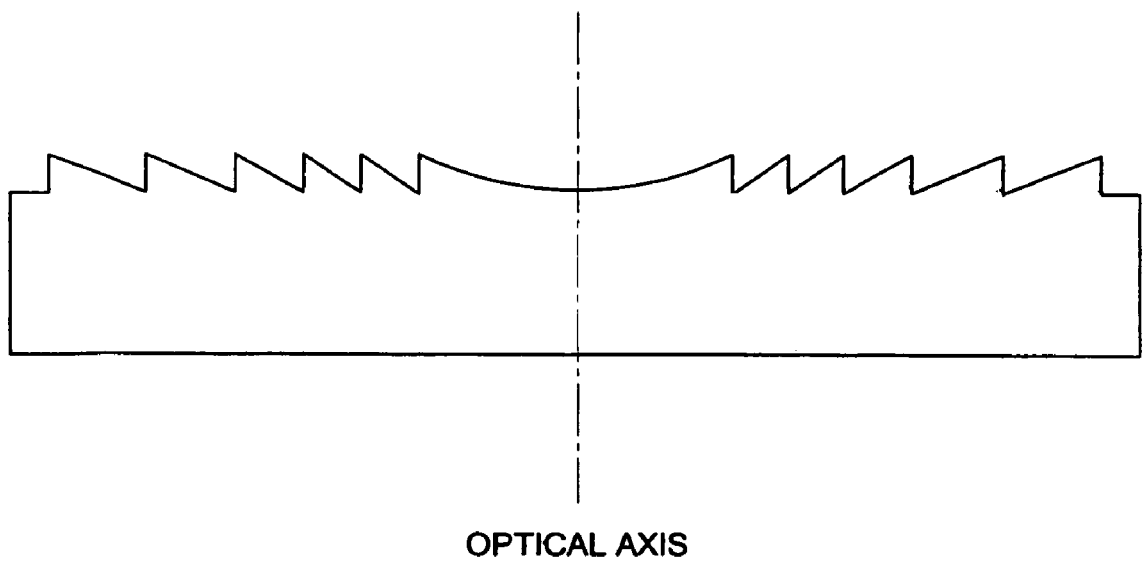

As the optical path difference generating structure, a diffractive structure is preferable. While the diffractive structure in the invention is not limited, and represents a structure generating a diffraction of light, a diffractive structure whose cross-section structure is a saw tooth-shape, such like FIG. 2(a) and FIG. 2(b), is preferably exemplified.

Figure 3:
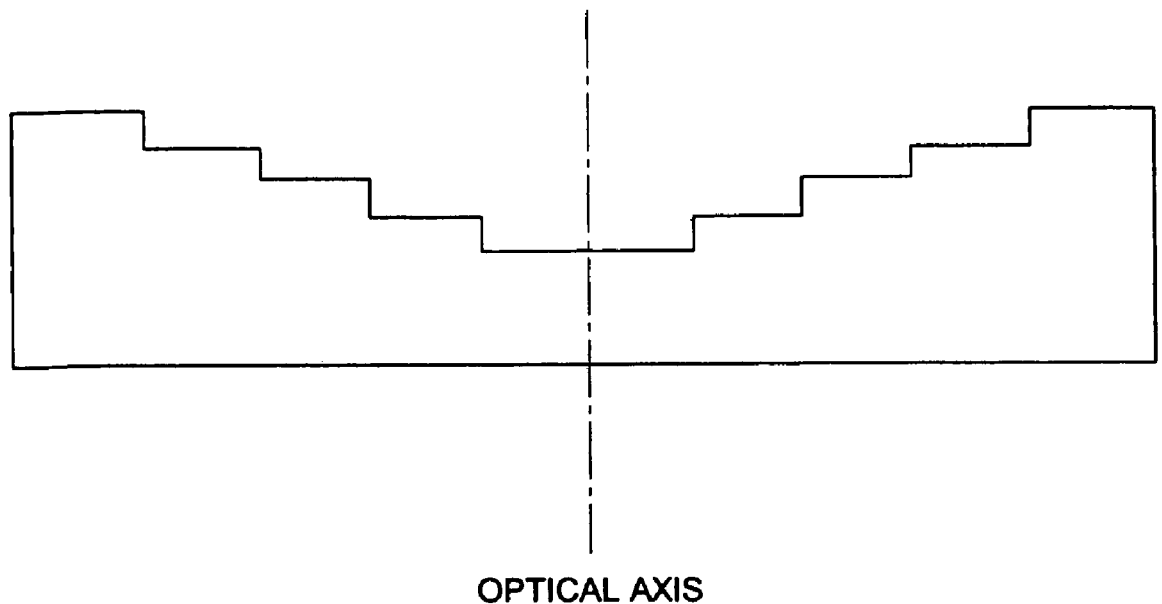
FIG. 3(*a*) is a cross-section diagram of an example of an optical element having a stepwise-shape diffractive structure.
Figure 3:
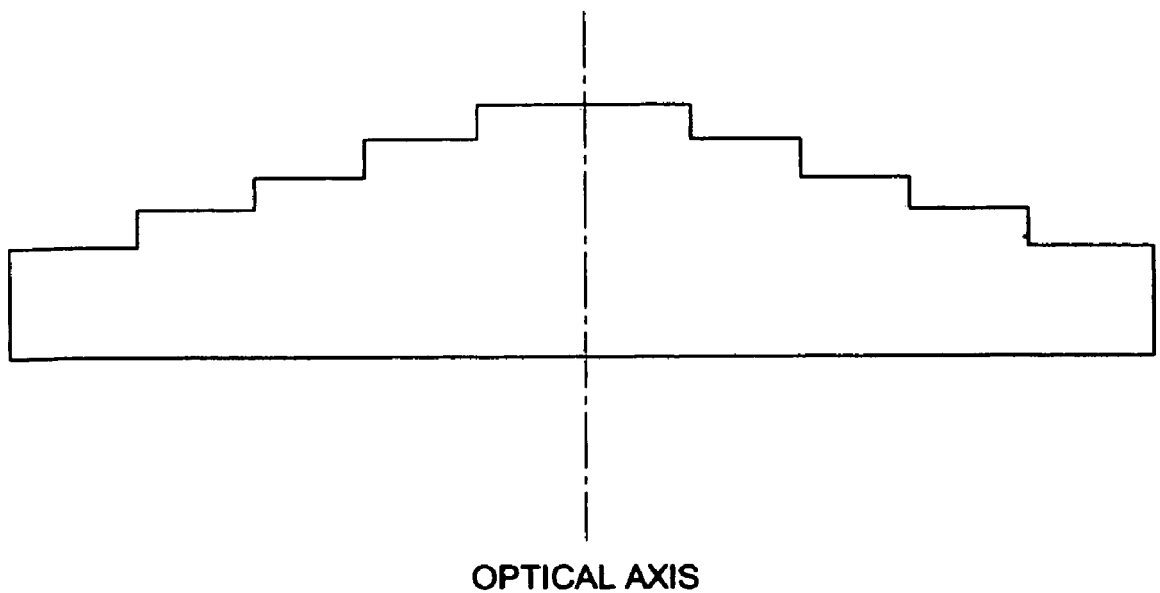
Figure 4:
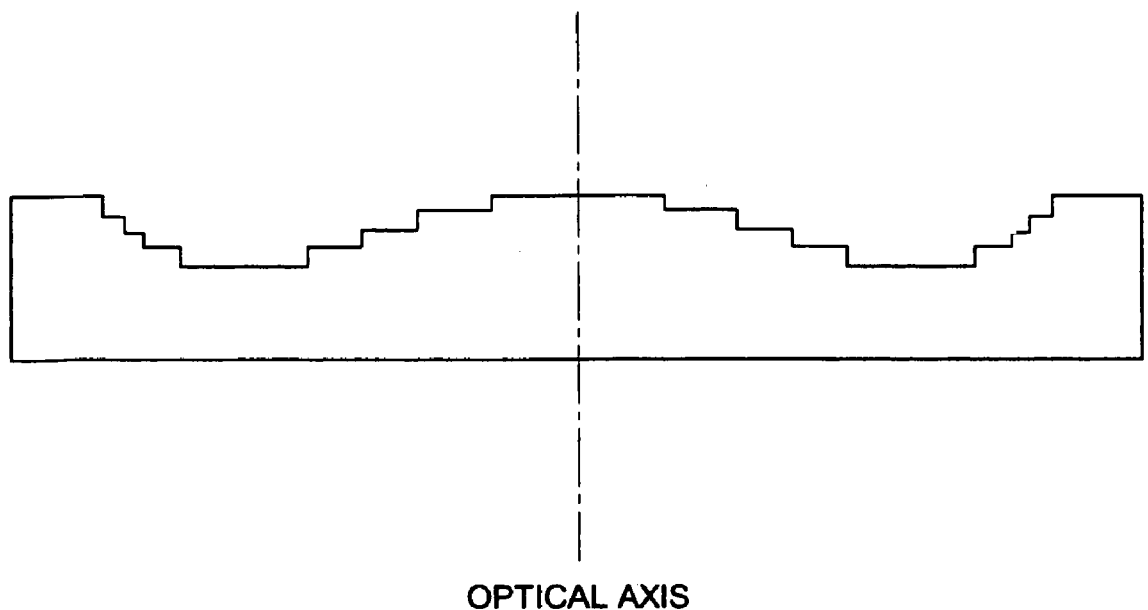
FIG. 4(*a*) is a cross-section diagram of an example of an optical element having a non-periodic-phase structure (NPS).
Figure 4:
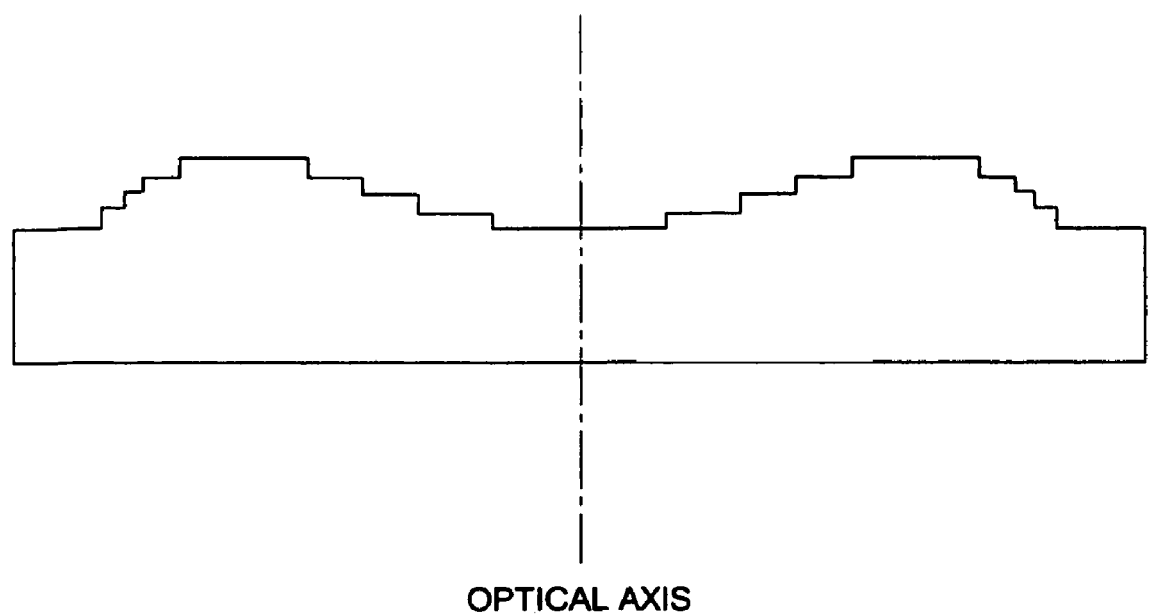

Further, as the diffractive structure, a diffractive structure whose cross-section structure is a stepwise-shape, such like FIG. 3(a) and FIG. 3(b) is also preferably used. The stepwise-shape structure like this is called also a multi-level structure.

Figure 5:
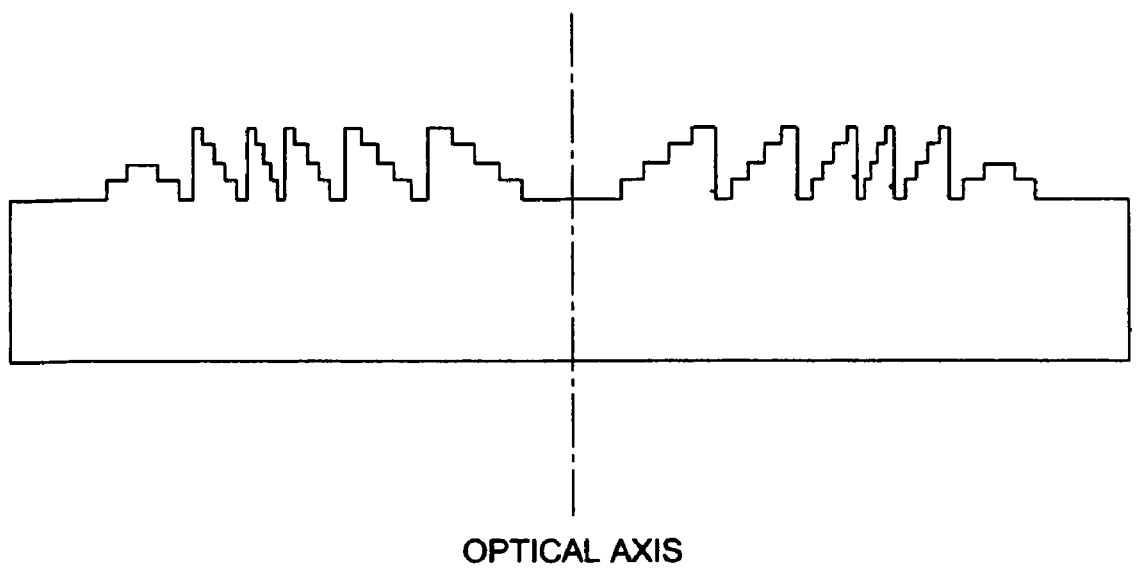
FIG. 5(*a*) is a cross-section diagram of an example of an optical element having a superposition-type diffractive structure.
Figure 5:
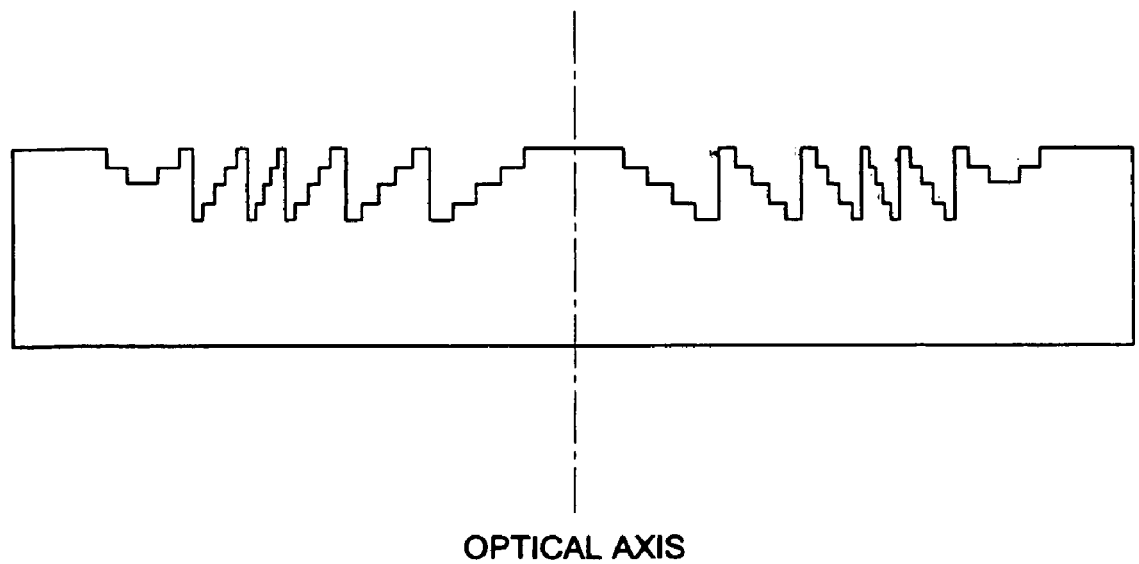

Still further, as shown in FIG. 5(a) and FIG. 5(b), a superposition-type diffractive structure, in which each of the ring-shaped zones of the saw tooth-shape diffractive structure or the stepwise-shape diffractive structure is further stepwise divided by plural steps in the direction of the optical axis, is also preferably used. By appropriately adjusting the length and the number of the steps of the superposition-type diffractive structure, in an optical pickup device utilizing plural light source having different wavelength, it is possible to selectively diffract a light flux having a predetermined wavelength as well as to pass the other light flux through, to make diffractive orders of three different wavelength light source being different from each other, and to give a function for making the diffraction efficiency of a predetermined wavelength extremely small to plural incident light fluxes having different wavelengths.

Figure 6A:
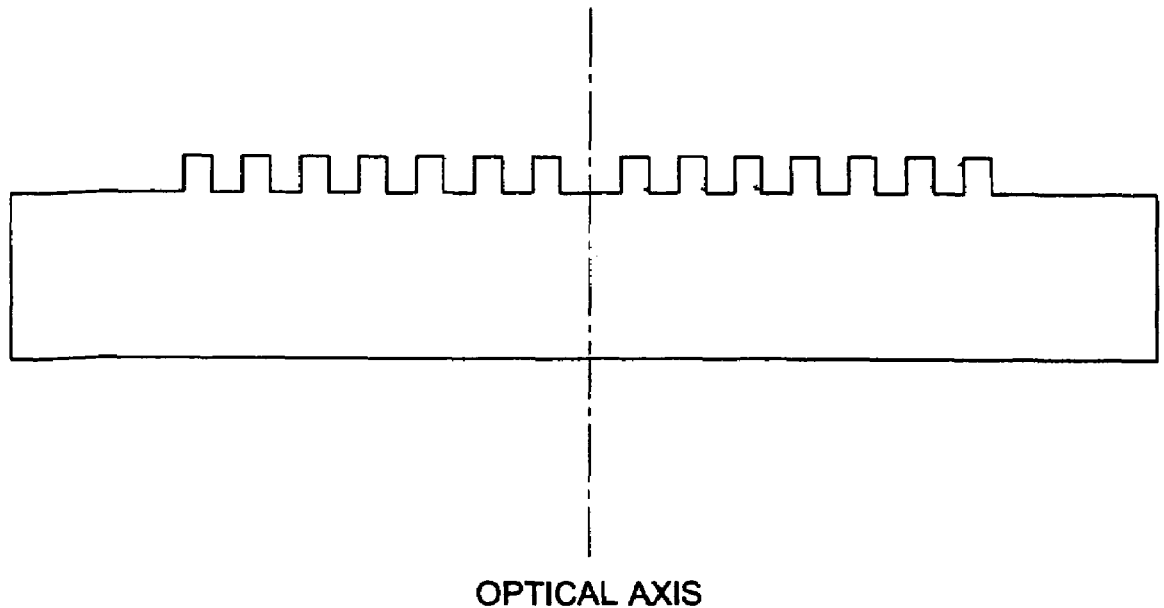
FIG. 6(*a*) is a cross-section diagram of an example of an optical element having a comb tooth-shape diffractive structure.
Figure 6B:
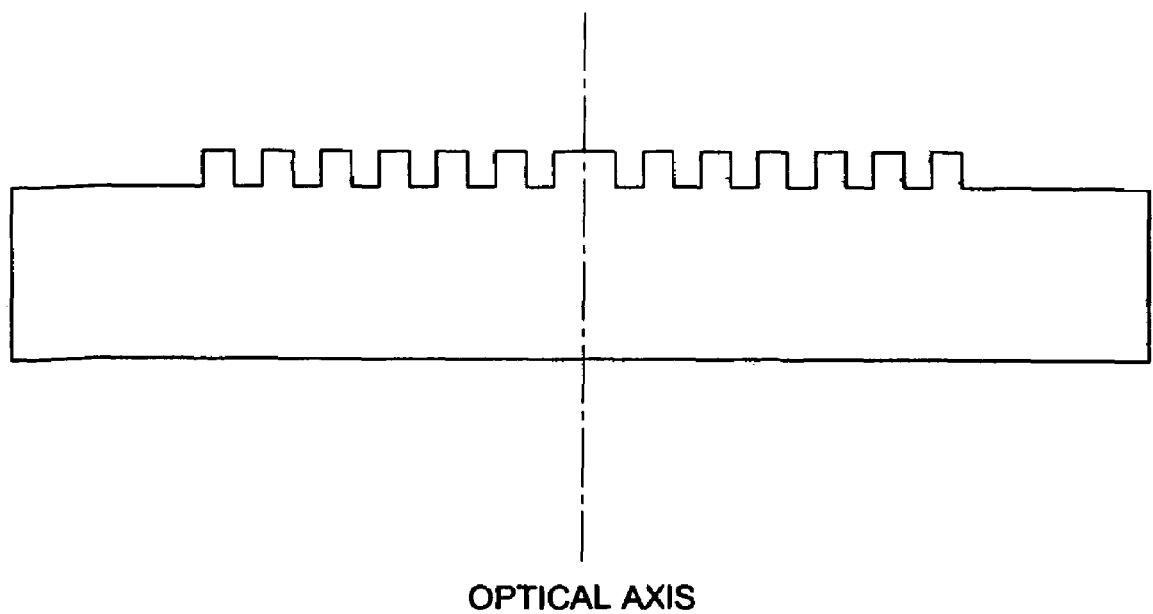

As another example of the diffractive structure, a diffractive structure whose cross-section structure is a comb tooth-shape, such like FIG. 6(a) and FIG. 6(b) is also preferably used.

Of course, the shape of the diffractive structure is not limited to the above-described structures, and can be appropriately adjusted in accordance with a design for achieving the necessary optical performance. The above-described structures may be used in combination.

Further, the optical path difference-generating structure in the present invention is preferably a phase difference-generating structure. The phase difference-generating structure represents a structure comprising a central region including an optical axis and plural ring-shaped zones divided by fine steps around the central region, and represents a structure giving a phase difference to the incident light fluxes being incident into the adjacent ring-shaped zones. While there is no structural limitation, structures similar to the above-described diffractive structure are preferably used.

Further, as the phase difference-generating structure, a non-periodic phase structure, such like FIG. 5(a) and FIG. 5(b), is also preferably used.

A preferable structure of the non-periodic phase structure is a structure, in which a ring-shaped zone adjacent to an outer side of a central region is formed to be shifted in the optical axis direction to make the optical path length of the ring-shaped zone being longer than that of the central region, a ring-shaped zone at the maximum effective diameter position is formed to be shifted in the optical axis direction to make the optical path length of the ring-shaped zone at the maximum effective diameter position being longer than that of the ring-shaped zone at the outside of the ring-shaped zone at the maximum effective diameter position, and a ring-shaped zone at a predetermined effective diameter position is formed to be shifted in the optical axis direction to make the optical path length of the ring-shaped zone at the predetermined effective diameter position being shorter than that of both of ring-shaped zones adjacent to the outside and the inside of the ring-shaped zone at the predetermined effective diameter position. Here, "central region" represents an optical functional region including the optical axis and being surrounded by a step, which is the nearest to the optical axis.

Further, while all of the structures exemplified in FIGS. 2(a) to 6(b) are plane optical elements, on which optical functional surfaces are formed, the optical element of the invention is not limited to such the structures, and the optical element may be a positive lens or a negative lens. Similarly, the above-described optical functional surface does not have to be formed on a plane surface, the optical functional surface may be formed on an optical surface having a desired refractive surface or an aspherical surface.

Contents of the invention will be explained in detail as follows, referring to the drawings, and embodiments of the invention are not limited to the following.

First Embodiment

The first embodiment will be explained, referring to FIG. 1.

A target in the first embodiment is an optical pickup device that is compatible for three formats including "high density optical disc" employing the so-called violet laser light source with working wavelength of 405 nm, DVD and CD, and a "high density optical disc" with protective substrate thickness t1 of 0.6 mm is imagined as the first optical information recording medium, DVD with protective substrate thickness t2 of 0.6 mm is imagined as the second optical information recording medium, and CD with protective substrate thickness t3 of 1.2 mm is imagined as the third optical information recording medium. The symbol D0 in FIG. 1 represents a surface on which a protective substrate surface of a recording medium is placed, and its positional relationship with a light source is not changed by a type of a recording medium. In this case, a thickness of each of D1, D2, D3 and D0 shows a base board thickness.

FIG. 1 is a schematic diagram showing an optical pickup device related to the first embodiment.

Laser diode LD1 is a first light source for which the blue-violet laser having wavelength λ1 of 405 nm is used, and those having a wavelength in a range of 390 nm-420 nm can be used properly. LD2 is a second light source for which the red laser having wavelength λ2 of 655 nm is used, and those having a wavelength in a range of 630 nm-680 nm can be used properly. LD3 is a third light source for which the infrared laser having wavelength λ3 of 780 nm is used, and those having a wavelength in a range of 750 nm-800 nm can be used properly.

The laser diode LD2 is a light source unit of the so-called two-laser one-package type wherein two light-emitting points including the second light source (light source for DVD) and the third light source (light source for CD) are contained in the same package.

In this package, the second light source is adjusted to be positioned on the optical axis, and thereby, the third light source is positioned to be away slightly from the optical axis, resulting in occurrence of an image height. However, technologies to improve this problem are already known, and these technologies can be applied as occasion demands. In this case, correction plate DP is used to correct the problem. On the correction plate DP, there is formed a grating which corrects deviation from the optical axis and also contributes to light-convergence to sensor S2.

Incidentally, solid lines emitted from LD2 represent a light source light flux for DVD, while dotted lines emitted from LD2 represent a light source light flux for CD.

Light source light fluxes emitted respectively from LD1 and LD2 enter beam splitter BS1 which transmits them to guide to OBL representing an objective optical system.

A light flux emitted from LD1 enters beam shaper BSL to be improved in terms of quality, then, passes through the BS1 to enter collimator CL to be collimated to be infinite parallel light, and passes through BS3 and beam expander BE that is composed of a concave lens and a convex lens to enter objective lens OBL representing an objective optical element (an optical element closest to an optical disc). Then, the parallel light forms a light-converged spot on an information recording surface through a protective substrate of the first optical information recording medium. Then, after being reflected on the information recording surface, the parallel light follows the same path to pass through collimator CL1 to be converged on sensor S1 after passing through sensor lens SL1 by BS3. This sensor conducts photoelectric transduction for the parallel light to generate electric signals.

Incidentally, an unillustrated $\lambda/4$ (quarter wavelength) plate is arranged between the beam expander BE and objective lens OBL, and thereby, there is caused a slip exactly of a half wavelength between going and returning, and the direction of polarization is changed. Accordingly, the light flux in the going path is changed in terms of direction by BS3.

Now, the beam shaper BSL has two different curvatures for two directions including the direction perpendicular to the optical axis and the direction perpendicular to the aforementioned direction (having the curvature that is non-symmetric about rotation regarding the optical axis).

With respect to a light flux emitted from the light source, an angle of divergence in the direction perpendicular to the optical axis and an angle of divergence in the direction perpendicular to the aforementioned direction are different from each other, due to the structure of the semiconductor light source, and thereby, the light flux is a beam whose section is in an oval shape when viewed in the optical axis direction, which is not preferable as a light source light flux for an optical disc. Therefore, a different refraction function is given to each direction by beam shaper BSL so that the emergent light flux may be a beam whose section is substantially circular.

Though the beam shaper BSL is arranged in the optical path of LD1 in this case, it is also possible to arrange it in the optical path of LD2, naturally.

In the same way as in the case of LD1, the light flux emitted from DL2 also forms a light-converged spot on an optical disc (second optical information recording medium, third optical information recording medium), and is converged on sensor S2 finally, after being reflected. The optical path is made by BS2 to agree, and there is no change from an occasion of LD1.

Incidentally, though the objective optical element OBL is a single lens in the drawing, it may also be composed of a plurality of optical elements as occasion demands. The material is plastic resin wherein particles relating to the invention are dispersed which is described.

There is drawn how the light flux emitted from each LD is converged on an information recording surface through a protective substrate of an optical disc, wherein, a distance between the light source and a surface of a protective substrate remains unchanged in various standards of recording media for reproducing/recording, however, the basic position (standard position) of an objective optical element is changed by an actuator, and focusing is conducted from the standard position.

A numerical aperture required for objective optical element OBL also varies depending on a thickness of a protective substrate of each optical information recording medium and in a size of a pit. In this case, a numerical aperture for CD is made to be 0.45, and that for DVD and "high density optical disc" is made to be 0.65. However, it is possible to select the numerical aperture properly within a range of 0.43-0.50 for CD and a range of 0.58-0.68 for DVD.

Incidentally, IR represents a diaphragm for cutting unwanted light.

Further, though a parallel light enters objective lens OBL, it is also possible to arrange so that finite divergent light may enter without being collimated.

The optical element relating to the first embodiment is an element having an optical function which is made of plastic resin relating to the invention stated later, and it is represented by the aforesaid-correction plate, a beam splitter, a beam shaper, a collimator, a beam expander, an objective optical element (objective lens), a sensor lens and $\lambda/4$ plate. Problems in the conventional technologies are solved by using these optical elements wherein temperature dependence for changes in refractive index is extremely small.

In the first embodiment, the material stated above is used also for objective optical element OBL that is arranged in the optical path which is common to the first, second and third light sources and has a diffractive structure. The saw tooth-shaped diffractive structure is provided on the objective optical element.

This is the structure wherein minute steps in a shape of concentric circles whose centers are on the optical axis are provided, and a prescribed optical path difference is given to light fluxes passing through adjoining ring-shaped zones.

By establishing a pitch (diffracting power) of the saw tooth and a depth (blazed wavelength), a light flux emitted from the first light source within specific NA is formed as a light-converged spot by the secondary diffracted light for a "high density optical disc", and a light flux emitted from the second light source within the same NA is formed as a light-converged spot by the primary diffracted light for DVD.

By using light having a different diffraction order as stated above, it is possible to enhance diffraction efficiency in each case and to secure an amount of light.

For CD, it is preferable that a light flux emitted from the third light source within the same NA is made to be diffracted light with the same order (primary) as in DVD, and it is also possible to make them to be different in terms of diffraction order. In the present example, a light-converged spot is formed as a primary diffracted light which is the same as that in DVD.

In this case, a light flux having the specific NA or more emitted from the third light source has turned into a flare which is not converged on an information recording surface of CD.

In the case of standards where a thickness of a protective substrate of "high density optical disc" is different from that of DVD, a light flux emitted from the second light source passing through NA in a range larger than that established for DVD is made to be a flare which is not converged on an information recording surface of DVD. In other words, the objective optical element in this case has three areas each being different from others in terms of a characteristic.

The diffractive structure of this kind is an example of an optical path difference-generating structure, and in addition to this, the above-described optical path difference-generating structures can be used, appropriately.

Further, the optical path difference-generating structure is used in this case for the purpose of correcting spherical aberration caused by a difference of substrate thickness of an optical disc format. However, in addition to that, the aforementioned structure can naturally be used for correcting aberration caused by a wavelength difference of the working wavelength or by a fluctuation (mode-hop) of the working wavelength. In the former case, spherical chromatic aberration caused by a wavelength difference of 50 nanometers or more is corrected, and in the latter case, microscopic wavelength fluctuations within 5 nanometers are corrected.

In general, fluctuations of a focal point position caused by temperatures are prevented by stressing the light-converging function of an objective lens, as disclosed in the Japanese Un-examined Patent Application Publication No. H11-337818. However, in the invention, the devices mentioned above are not necessary, and the degree of freedom for design can be shared out to other purposes.

Though a practice of providing a diffractive structure on an objective optical element has been explained in the present example, it is naturally possible to provide the diffractive structure also on other elements such as a collimator and a coupling lens.

It is most preferable that the material of this kind is used for an optical element having a refracting interface or an aspheric surface.

Further, it is preferable to employ an optical element whose refractive index change caused by temperatures is made to be extremely small, or an optical element using the material of this kind, at a location where high temperature is generated in an optical pickup device, or as an optical element that is held by an actuator and changes its working position.

Specifically, it is preferable to use as an optical element in an optical pickup device in which a difference between a temperature at out of use (the state where an actuator is not energized and a temperature is substantially a room temperature) and a temperature in use (the state where an actuator is energized and heat is constantly generated) is 5° C. or more. On the contrary, the state where the aforesaid temperature difference is 50° C. or more is not preferable, because other functions are adversely affected, such as occurrence of distortions of discs.

Further, in the aforesaid example, there is shown a practice in which a base material for beam shaper BSL is devised, and it can also be used for a light intensity distribution converting element that converts intensity distribution of an incident light flux.

Since the beam shaper and the light intensity distribution converting elements are frequently arranged at positions which are relatively close to the light source, it is extremely preferable to make these elements to be optical elements relating to the invention.

Incidentally, the light intensity distribution converting element is an optical element from which an incident light flux having mainly Gaussian distribution emerges as a light flux having a different light intensity distribution.

This can make the light intensity distribution of an emergent light flux to be uniform according to the purpose, and can make the light intensity on the outermost edge portion of the emergent light flux to be 45-90% of the light intensity in the vicinity of the optical axis.

Next, changes in refractive index caused by temperature changes will be explained.

The changes in refractive index caused by temperature changes are expressed by the following formula A, by differentiating refractive index n with temperature t, based on Lorentz•Lorenz's formula.

$$A = \frac{(n^2+2)(n^2-1)}{6n}\left\{(-3\alpha) + \frac{1}{[R]}\frac{\partial [R]}{\partial t}\right\}$$ (Formula 3)

α: the coefficient of linear expansion, [R]: molecular refraction

In the case of plastic material, contribution of the second term is generally smaller than that of the first term, and it can be ignored substantially. For example, in the case of PMMA resin, coefficient of linear expansion α is $7\times10^{-5}$, and when it is substituted for α in the aforesaid formula, the value obtained by the formula comes to $-1.2\times10^{-4}$ which almost agrees with an actually measured value.

In the invention, in this case, a contribution of the second term in the aforesaid formula is made to be greater substantially by dispersing fine-grains, preferably, dispersing inorganic fine-grains in resin, so that the change by the linear expansion of the first term may be canceled by the contribution of the second term.

To be concrete, it is preferable that the change which has so far been about $-1.2\times10^{-4}$ is controlled to be less than $8\times10^{-5}$ in an absolute value. To control the change to be less than $6\times10^{-5}$ is more preferable, and to control the change to be less than $10\times10^{-4}$ is still more preferable, as an optical design or as an optical element.

It is also possible to make a material to have temperature characteristic which is opposite to that of an original plastic material, by enlarging further the contribution of the second term. In other words, it is also possible to obtain a material wherein the refractive index is raised, on the contrary, without being lowered when a temperature rises.

As explained in FIG. 1, many optical elements are used in the optical system (optical path) from s light source to an optical information recording medium, in the optical pickup device. By combining characteristics for changes in refractive index for temperatures properly, new effects such as downsizing of the total optical pickup-device can be created.

When temperature changes, a form is also changed minutely, and thereby, the refracting function is changed, under which, if these can further be canceled as a different application, it is extremely preferable as an optical element. In other words, in the case of performing temperature correction by combining a convex lens and a concave lens, in spite of the original desire to combine a convex lens and a convex lens to attain the optical system in the past, it becomes possible to combine the convex lens and the convex lens as desired.

When obtaining the optical element of this kind, a value of the formula stated above is preferably made to be as follows.

$$0 < A < 8 \times 10^{-4}$$

Incidentally, the structure of this kind can be applied preferably not only to the optical pickup device but also to a photographing optical system.

Next, a method to mold an optical element of the invention will be explained.

As stated above, with respect to the technology to disperse grains in plastic resin, there is known a method to make grains to have electric charges.

For example, a chamber is filled with pellet-shaped plastic resin, then, grains are put in the chamber to be dispersed, and the inside of the chamber is heated so that plastic resin is melted. In this way, the dispersed grains are dispersed in the melted plastic resin. In this case, it is possible to agitate to prevent precipitation, to apply an electric field and a magnetic field, and to provide supersonic waves.

Further, when the melted plastic resin is used for injection molding, there is considered a method to add grains by using an inline mixer. In this case, grains are mixed in a spiral form on the line, and the state of dispersion can be created preferably.

When the plastic resin in which fine-grains are dispersed is cooled and solidified once, and then is melted again to be used for injection molding, there is a possibility that the state of dispersion is changed by reheating and repeated fusion, and microscopic burn marks are generated on resin on a peripheral portion of the grain, which is not preferable. When the burn marks are generated, in particular, transmittance for a ray of light is lowered depending on the regions of burn marks, and it is impossible to use as an optical element.

Therefore, once plastic resin is melted and grains are dispersed, it is preferable to obtain molded articles while keeping the melted and dispersed state.

Namely, it is preferable to disperse grains each having a diameter of 30 nanometers in plastic resin in the melted state, and to pour the melted plastic resin into a metal mold while keeping the melted state to obtain molded articles.

An optical element of this invention comprises plastic resin and fine particles as mother materials, and the mixing method is not specifically limited. That is, applied can be any methods such as a method in which plastic resin and fine particles are prepared each independently followed by mixing the both, a method in which fine particles are prepared in the presence of a plastic having been prepared in advance and a method in which both of plastic resin and fine particles are simultaneously prepared. Specifically, for example, preferably listed is a method in which two solutions, a solution in which plastic resin is dissolved and a dispersion in which fine particles are homogeneously dispersed, are mixed uniformly and the mixed solution is poured into a solution having a poor solubility for the plastic resin to prepare an objective material composition, however, this invention is not limited thereto.

In an optical element of this invention, the mixing degree of plastic resin and fine particles is not specifically limited, however, being mixed uniformly is preferred to exhibit the effects of this invention more efficiently. When the mixing degree is insufficient, possibly caused may be an effect to optical characteristics, in particular, such as a refractive index, an Abbe's number and light transmittance, as well as an effect to manufacturing properties such as a thermoplastic property and a fusion molding property. The degree of mixing is considered to be affected by the preparation method, and it is important to select the method in sufficient consideration of characteristics of plastic resin and fine particles utilized. To uniformly mix the both plastic resin and fine particles, preferably employed in this invention can be a method to directly mix plastic resin and fine particles.

Next, there will be given an explanation about a metal mold which is preferable for molding an optical element of the invention.

A form of the metal mold includes those for transferring microscopic shapes including the aforesaid optical path difference providing structure, aspheric shapes, or those for transferring a shape of optical axis non-rotation symmetry such as a beam shaper and a combination of them.

Fluidity of resin in a metal mold in the case of molding and transferring and releasability (mold release characteristics) in the case of taking molded articles out of the mold are the points which the metal mold must have.

Regarding the metal mold, therefore, it is preferable to employ the one wherein basic forms are formed on a metallic core material (steel material or stainless steel material) and metal plating is applied on the surface of the metallic core. A thickness of a metal-plated layer can be determined properly within a range of 10-100 μm. When providing an optical path difference providing structure, it is preferable that the metal-plated layer is subjected to cutting processing to be provided.

It is further possible to apply protection coating with diamond-like carbon (DLC), for an improvement of mold release characteristics and for protection of a mold.

Namely, it is preferable to conduct injection molding on a metallic core material with plastic resin in which grains each having a diameter of 30 nanometers are dispersed, by the use of a molding die on which a plated-layer is formed.

EXAMPLE

In the following, a resin composition utilized in an optical element of this invention will be specifically explained referring to an example, however, embodiments of this invention are not limited thereto.

Example 1

Preparation of Inorganic Fine Particles 1

In an atmosphere of nitrogen, a solution in which 2.5 g of pentaethoxy niobium was added into 32.31 g of 2-methoxyethanol was prepared. A mixed solution comprising 0.35 g of water and 34.45 g of 2-methoxyethanol was added drop-wise into the above solution while being stirred. After the resulting solution was stirred for 16 hours at room temperature, it was concentrated so as to make an oxide concentration of 5 weight % resulting in preparation of $Nb_2O_5$ dispersion. The particle diameter distribution of obtained $Nb_2O_5$ dispersion was measured by means of a dynamic confusion method, and the mean particle diameter was 6 nm. These particles were designated as inorganic fine particles 1.

Preparation of Inorganic Fine Particles 2

In an atmosphere of nitrogen, a solution in which 2.0 g of pentaethoxy niobium was added into 16.59 g of 2-methoxyethanol was prepared. A mixed solution comprising 0.26 g of lithium hydroxide hydrate and 18.32 g of 2-methoxyethanol was added drop-wise into the above solution while being stirred. After the resulting solution was stirred for 16 hours at room temperature, it was concentrated so as to make an oxide concentration of 5 weight % resulting in preparation of $LiNbO_3$ dispersion. The particle diameter distribution of obtained $LiNbO_3$ dispersion was measured by means of a dynamic confusion method, and the mean particle diameter was 5 nm.

Into this dispersion of 100 g, 300 g of methanol and nitric acid aqueous solution of 1 mol % were added, and a mixed solution of 100 g of methanol and 6 g of cyclopentyl trimethoxysilane were further added over a period of 60 minutes while being stirred at 50° C., followed by 2 hours of stirring. The obtained transparent dispersion was suspended in ethyl acetate, which was subjected to centrifugal separation to prepare white fine particle powder. This powder had a mean particle diameter of 6 nm according to TEM observation, and was designated as fine particles 2.

Preparation of Resin Composition

Preparation of Resin Composition 1

Dispersion of inorganic fine particles 1 of 6 g were added drop-wise into 10 g of a chloroform solution, in which 10 weight % of resin (3) described in foregoing Table 1 was dissolved, while stirring at ordinary temperature. Obtained colorless transparent liquid was sedimented in a mixed solution, comprising equivalent volume of methanol and water by use of a homogenizer, resulting in preparation of resin composition in which inorganic particles are dispersed at 25% against resin (3).

Preparation of Resin Composition 2

By utilizing a powder of inorganic particles 2 and a cyclohexane solution in which 10 weight % of resin (2) were dissolved, resin composition 2, in which 15 weight % against resin (2) of inorganic particles were dispersed, was prepared in a similar manner to resin composition 1.

TABLE 2

| | | Inorganic fine particles | |
| --- | --- | --- | --- |
| | Resin | Type | Content (weight %) |
| Resin composition 1 | Resin (3) | Inorganic fine particles 1 | 30 |
| Resin composition 2 | Resin (2) | Inorganic fine particles 2 | 15 |

Evaluation of Refractive Index

Resin compositions 1 and 2 were heating molded to prepare test plates of 0.5 mm thick respectively, refractive indexes of which were measured varying the temperature over 10-30° C. by use of an Abbe's refractometer (DR-M2, produced by Atago Co., Ltd.) at a wavelength of 500 nm, and variation of the refractive index with temperature dn/dt was determined. Further, as comparisons, dn/dt with respect to resin (3) and resin (2) without mixing inorganic fine particles was also determined in a similar manner. The results are shown in Table 3.

Evaluation of Transmittance

Resin compositions 1 and 2 were heating molded to prepare test plates of 3 mm thick respectively. Light transmittance of each sample was measured by use of Turbidity Meter T-2600DA, produced by Tokyo Denshoku Co., Ltd. according to a method of ASTM D1003. The results are shown in Table 3.

TABLE 3

| | dn/dt ($10^{-6}$/K) of resin itself | dn/dt ($10^{-6}$/K) of resin composition | Transmittance (%) |
| --- | --- | --- | --- |
| Resin composition 1 | −114 (resin (3)) | −57 | 88 |
| Resin composition 2 | −110 (resin (2)) | −40 | 90 |

As described above, the resin material, in which inorganic particles are dispersed in a plastic resin, of the present invention is an optically excellent material having a small temperature dependence in its refractive index, and a high transmittance. Further, since the material has a plasticity and projection mold ability, it is very excellent in molding ability. There is no conventional material, which has both of such excellent optical property and molding ability.

The optical element of the optical pickup device of the invention makes it possible to realize an optical pickup device wherein a change of a refractive index caused by temperature changes is small, and a function to form a light-converged spot is not changed. Further, the degree of freedom for design shared out to temperature correction can be utilized for other purposes, which broadens possibility for design of optical elements.

What is claimed is:

1. An optical element for an optical pickup device, comprising an optical surface which is an optical functional surface having a predetermined optical function,
    wherein the optical element is produced by molding a resin material, in which inorganic particles having a diameter of not more than 30 nm are dispersed in a plastic resin,
    wherein the optical pickup device is capable of recording information to and/or reproducing information from a first optical information recording medium comprising a first protective substrate having a thickness of t1, and is capable of recording information to and/or reproducing information from a second optical information recording medium comprising a second protective substrate having a thickness of t2, which is smaller than t1, and
    wherein the optical functional surface compensates a spherical aberration generated due to a difference between a thickness of the first protective substrate and the thickness of the second protective substrate.

2. The optical element of claim 1, wherein when a change in a refractive index of the plastic resin due to a temperature change is represented by $dn_1/dt_1$, and a change in a refractive index of the inorganic particle due to a temperature change is represented by $dn_2/dt_2$, a sign of $dn_1/dt_1$ and a sign of $dn_2/dt_2$ are different from each other.

3. The optical element of claim 2, wherein the optical element satisfies the following conditions:

$$|A| < 8 \times 10^{-5}$$

where A represents a value shown by the following expression;

$$A = \frac{(n^2+2)(n^2-1)}{6n}\left\{(-3a) + \frac{1}{[R]}\frac{\partial[R]}{\partial t}\right\}$$

wherein a represents the coefficient of linear expansion and [R] represents the molecular refraction.

4. The optical element of claim 3, wherein the optical element satisfies the following condition.

$$|A|<16\times10^{-5}$$

5. The optical element of claim 3, wherein the optical element satisfies the following condition.

$$|A|<10\times10^{-4}$$

6. The optical element of claim 2, wherein at least one surface of the optical element is a refractive surface.

7. The optical element of claim 6, wherein the refractive surface is an aspherical surface.

8. The optical element of claim 1, wherein the optical functional surface comprises a fine structure.

9. The optical element of claim 8, wherein the optical pickup device comprises the optical element, a first light source emitting a first light flux having a wavelength of $\lambda 1$, and a second light source emitting a second light flux having a wavelength of $\lambda 2$, which is longer than $\lambda 1$,
   wherein the optical pickup device is capable of recording information to and/or reproducing information from a first optical information recording medium with utilizing the first light flux, and is capable of recording information to and/or reproducing information form a second optical information recording medium with utilizing the second light flux, and
   wherein the optical functional surface compensates an aberration generated due to a difference between the wavelength $\lambda 1$ of the first light flux and the wavelength $\lambda 2$ of the second light flux.

10. The optical element of claim 9, wherein the difference between the wavelength $\lambda 1$ and the wavelength $\lambda 2$ is not less than 50 nm.

11. The optical element of claim 8, wherein the optical pickup device comprises the optical element and a first light source emitting a first light flux having a wavelength of $\lambda 1$,
    wherein the optical pickup device is capable of recording information to and/or reproducing information from a first optical information recording medium with utilizing the first light flux, and
    the optical functional surface compensates an aberration generated due to a wavelength variation from $\lambda 1$ of the first light flux emitted by the first light source.

12. The optical element of claim 11, wherein an amount of the wavelength variation from $\lambda 1$ of the first light flux emitted by the first light source is not more than 5 nm.

13. The optical element of claim 8, wherein the optical functional surface includes an optical path difference-generating structure.

14. The optical element of claim 13, wherein the optical path difference-generating structure is a diffractive structure.

15. The optical element of claim 14, wherein the diffractive structure is a saw tooth-shape diffractive structure.

16. The optical element of claim 14, wherein the diffractive structure is a superposition-type diffractive structure.

17. The optical element of claim 13, wherein the optical path difference-generating structure is a phase difference-generating structure.

18. The optical element of claim 13, wherein the optical path difference-generating structure is a non-periodic phase structure.

19. The optical element of claim 1, wherein the inorganic particles are an inorganic oxide.

20. The optical element of claim 19, wherein the inorganic oxide is in a saturated oxidation state.

21. The optical element of claim 1, wherein the resin material comprises an antioxidant.

22. The optical element of claim 1, wherein a volume ratio of the plastic resin and the inorganic particles is 9:1 to 3:2.

23. The optical element of claim 1, wherein the optical element comprises the inorganic particles in an amount of 5 to 80 weight % of the total weight of the optical element.

24. The optical element of claim 1, wherein a temperature difference of the pickup device between during use and during nonuse is not less than 5° C. and not more than 50° C.

25. The optical element of claim 1, wherein the optical element is an objective optical element.

26. The optical element of the claim 1, wherein the optical element is a beam shaper.

27. The optical element of claim 1, wherein when an incident light flux having a Gaussian distribution enters onto the optical element, the optical element emits a light flux having a light intensity distribution, which is different from the Gaussian distribution of the incident light flux.

28. The optical element of claim 27, wherein the optical element emits a light flux having an approximately uniform light intensity distribution.

29. The optical element of claim 27, wherein the optical element makes a light intensity of a light flux emitted from the outermost part of the optical element 45% to 90% of a light intensity of a light flux emitted from a paraxial part of the optical element.

30. An optical pickup device comprising:
    at least a light source; and
    an optical element comprising an optical surface which is an optical functional surface having a predetermined optical function,
    wherein the optical element is produced by molding a resin material, in which inorganic particles having a diameter of not more than 30 nm are dispersed in a plastic resin,
    wherein the optical pickup device is capable of recording information to and/or reproducing information from a first optical information recording medium comprising a first protective substrate having a thickness of t1, and is capable of recording information to and/or reproducing information from a second optical information recording medium comprising a second protective substrate having a thickness of t2, which is smaller than t1, and
    wherein the optical functional surface compensates a spherical aberration generated due to a difference between a thickness of the first protective substrate and the thickness of the second protective substrate.

31. A producing method of an optical element, comprising the steps of: obtaining a resin material by dispersing inorganic particles having a diameter of not more than 30 nm into a plastic resin, which is in a melting state; and obtaining the optical element by casting the resin material into a mold with keeping the melting state.

32. An optical element for an optical pickup device,
    wherein the optical element is produced by molding a resin material, in which inorganic particles having a diameter of not more than 30 nm are dispersed in a plastic resin, and the inorganic particles are an inorganic oxide.

33. An optical element for an optical pickup device,
    wherein the optical element is produced by molding a resin material, in which inorganic particles having a diameter of not more than 30 nm are dispersed in a plastic resin, and the resin material comprises an antioxidant.

34. An optical element for an optical pickup device,
    wherein the optical element is produced by molding a resin material, in which inorganic particles having a diameter of not more than 30 nm are dispersed in a plastic resin, and a volume ratio of the plastic resin and the inorganic particles if 9:1 to 3:2.

35. An optical element for an optical pickup device, wherein the optical element is produced by molding a resin material, in which inorganic particles having a diameter of not more than 30 nm are dispersed in a plastic resin, and the optical element comprises the inorganic particles in an amount of 5 to 80 weight % of the total weight of the optical element.

36. An optical element for an optical pickup device, wherein the optical element is produced by molding a resin material, in which inorganic particles having a diameter of not more than 30 nm are dispersed in a plastic resin, and a temperature difference of the pickup device between during use and during nonuse is less than 5° C. and not more than 50° C.

\* \* \* \* \*